(12) United States Patent
Nagata et al.

(10) Patent No.: US 6,269,083 B1
(45) Date of Patent: Jul. 31, 2001

(54) ATM NETWORK COMMUNICATION ROUTE MONITORING SYSTEM

(75) Inventors: Tatsuya Nagata; Kazuhiro Ozawa, both of Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/062,259

(22) Filed: Apr. 17, 1998

(30) Foreign Application Priority Data

Oct. 2, 1997 (JP) .................................................. 9-269580

(51) Int. Cl.[7] ................................ H04J 3/14; H04L 12/56

(52) U.S. Cl. ................................................ 370/248; 370/249

(58) Field of Search ..................................... 370/241, 248, 370/249, 250, 252, 254, 255

(56) References Cited

U.S. PATENT DOCUMENTS

| | | | |
|---|---|---|---|
| 5,675,578 | * 10/1997 | Gruber et al. | 370/248 |
| 5,740,159 | * 4/1998 | Ahmad et al | 370/249 |
| 5,974,046 | * 10/1999 | Kim et al. | 370/395 |
| 6,144,665 | * 11/2000 | Karasawa | 370/395 |
| 6,198,726 | * 3/2001 | Hayami et al. | 370/236 |

* cited by examiner

*Primary Examiner*—Min Jung
(74) *Attorney, Agent, or Firm*—Helfgott & Karas, P.C.

(57) ABSTRACT

A communication route monitoring system monitors a communication route in an ATM network with OAM loopback cells. The communication route monitoring system has a first OAM loopback cell delivering unit disposed in one of the communication devices which performs a network management function, a first returning and relaying unit disposed in each of the communication devices, and a communication route recognizing unit disposed in the communication device which performs the network management function. The first OAM loopback cell delivering unit delivers a first OAM loopback cell for confirming a communication route to a route terminal point. The first returning and relaying means returns the first OAM loopback cell upon reception of the first OAM loopback cell, together with its own location identification added thereto, to a source, and relays the received first OAM loopback cell to a next one of the communication devices. First OAM loopback cells together with added location identifications of the respective communication devices are returned to the communication route recognizing unit. The communication route recognizing unit analyzes the first OAM loopback cell returned from each of the first returning and relaying units to recognize a status of the communication route.

13 Claims, 18 Drawing Sheets

ATM NETWORK COMMUNICATION ROUTE MONITORING SYSTEM

BACKGROUND OF THE INVENTION

(1) Field of the Invention

The present invention relates to an ATM (Asynchronous Transfer Mode) network communication route monitoring system, and more particularly to a communication route monitoring system for monitoring a communication route, using OAM (Operation And Maintenance) loopback cells, in an ATM network which is made up of virtual paths (VP) or virtual channels (VC) and a plurality of communication devices for terminating or relaying the virtual paths or virtual channels.

More specifically, the present invention is concerned with an apparatus for maintaining, operating, and monitoring an ATM network, and provides a capability for confirming a VP/VC route using a loopback function which is one of fault management functions of OAM cells, even if there is no unitary management function of network maintenance. The present invention also provides a capability for identifying a cell transfer fault location, and automatically detecting a malfunction of a communication route and displaying communication route information, by collecting communication route information such as traffic information, performance information, etc. on the communication route, even in the absence of a unitary management function of network maintenance.

(2) Description of the Related Art

ATM networks provide PVC (Permanent Virtual Connection) services including point-to-point services and point-to-multi-point services, and also provide VC (Virtual Connection) services, making available a wide variety of path forms to which subscribers can connect. There have been growing connections between different multi-vendor communication systems. For these reasons, problems imposed on network communications have been diversified. In view of those diverse problems, there has been a demand for a function of automatically inspecting or specifying problems on communications between subscribers.

Heretofore, Japanese laid-open patent publication No. 7-235929 has disclosed a method of generating and updating path route information using an OAM loopback cell function as one way of maintaining, operating, and monitoring an ATM network. According to the disclosed method, three OAM loopback cell types, i.e., an OAM loopback cell for indicating a start of test, an OAM loopback cell for indicating particular-position loopback, and an OAM loopback cell for indicating an end of test, are provided for an arrangement equipped with an operation system (OpS) for managing a network and various network elements (NE) of the network. These OAM loopback cells are transmitted from an NE at one end of a path to be inspected for its route to another NE at a terminal end of the path.

Each of the NEs which have received an OAM loopback cell for indicating a start of test relays the OAM loopback cell to a next NE, and turns on a flag. Then, the NE at the one end of the path transmits an OAM loopback cell for indicating particular-position loopback. This OAM loopback cell is delivered individually to those NEs which are positioned on the path, with the names of the NEs being indicated, among all the NEs whose data are stored in a database of the operation system. The NEs which have received the OAM loopback cell addressed thereto return the received OAM loopback cell together with information representative of the reception of the cell, and turn off the flag. The OAM loopback cell which has reached the NE at the terminal end without being returned by any NE is returned as one having no destination.

Finally, the NE at the one end of the path transmits an OAM loopback cell for indicating an end of test. When each of the NEs has received this OAM loopback cell, it relays the cell to a next NE. If the flag of its own remains on, each of the NEs indicates to the operation system that it has not received an OAM loopback cell for indicating particular-position loopback.

The operation system adds the NE which has indicated that it has not received an OAM loopback cell for indicating particular-position loopback, as an NE positioned on the path inspected for its route to the database, and deletes the NE addressed by the cell which has been returned from the NE at the terminal end as one having no destination, from the group of NEs positioned on the path in the database.

In this manner, a VP/VC route is confirmed using the OAM cell loopback function in the ATM network.

According to the conventional method, however, it is necessary for the network to have the operation system (OpS) which provides a centralized maintenance and management function. It has been impossible with the conventional method to confirm communication routes in those networks which are not equipped with the operation system (Ops).

Furthermore, the conventional method requires that an OAM loopback cell for indicating an end of test reach each of NEs. Therefore, the conventional method is not effective in the event of a circuit disconnection in the path being inspected. Specifically, the communication route up to the fault location cannot be confirmed while the communication route up to the fault location remains connected. Naturally, the fault location cannot be identified.

In those networks which are not equipped with the operation system, NEs that perform a network management function are required to recognize traffic information, performance monitoring information, and congestion information. These requirements, however, cannot be met by the conventional method.

SUMMARY OF THE INVENTION

It is an object of the present invention to provide an ATM network communication route monitoring system which is capable of confirming a communication route in a network that is not equipped with an operation system (OpS) which provides a centralized maintenance and management function, and of confirming a communication route up to a fault location even in the event of a circuit disconnection in a path to be inspected for its route.

Another object of the present invention is to provide an ATM network communication route monitoring system which allows NEs that perform a network management function to easily recognize traffic information, performance monitoring information, and congestion information.

To achieve the above objects, there is provided in accordance with the present invention a communication route monitoring system for monitoring, with OAM loopback cells, a communication route in an ATM network including virtual paths or virtual channels and a plurality of communication devices for terminating or relaying the virtual paths or virtual channels, comprising first OAM loopback cell delivering means disposed in one of the communication devices which performs a network management function, for delivering a first OAM loopback cell for confirming a communication route to a route terminal point, first returning and relaying means disposed in each of the communication devices, for returning the first OAM loopback cell upon reception of the first OAM loopback cell, together with its own location identification added thereto, to a source, and relaying the received first OAM loopback cell to a next one of the communication devices, and communication route recognizing means disposed in the communication device which performs the network management function, for analyzing the first OAM loopback cell returned from the first returning and relaying means to recognize a status of the communication route.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
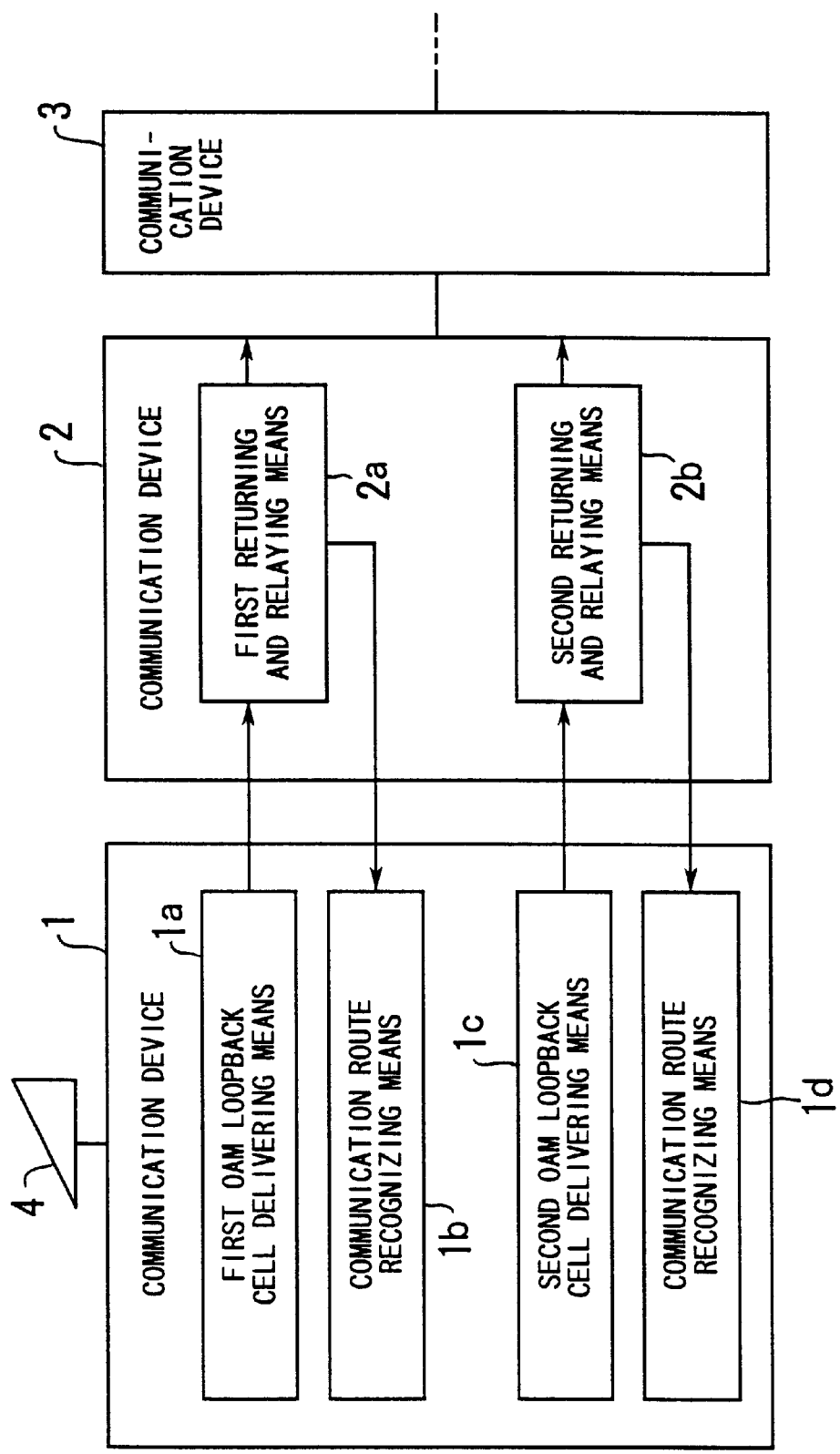
FIG. 1 is a block diagram illustrative of the principles of a first embodiment of the present invention.

The principles of a first embodiment of the present invention will be described below with reference to FIG. 1. According to the first embodiment, the principles of the present invention are applied to an ATM network communication route monitoring system incorporated in an ATM network of point-to-point paths. As shown in FIG. 1, the ATM network has a communication device 1 which performs a network management function, and communication devices 2, 3. The ATM network communication route monitoring system includes a first OAM loopback cell delivering means 1a, disposed in the communication device 1, for delivering a first OAM loopback cell for confirming a communication route to a route terminal point, a first returning and relaying means 2a, disposed in each of the communication devices 2, 3, for returning the first OAM loopback cell received from a source, together with its own location ID added thereto, to the source, and relaying the received first OAM loopback cell to a next communication device, and a communication route recognizing means 1b, disposed in the communication device 1, for analyzing the first OAM loopback cell returned from the first returning and relaying means 2a to recognize a status of the communication route.

The ATM network communication route monitoring system also includes a second OAM loopback cell delivering means 1c, disposed in the communication device 1, for delivering a second OAM loopback cell for collecting communication route information to the route terminal point, a second returning and relaying means 2b, disposed in each of the communication devices 2, 3, for returning the second OAM loopback cell received from a source, together with its own communication route information added thereto, to the source, and relaying the received second OAM loopback cell to a next communication device, and a communication route recognizing means 1d, disposed in the communication device 1, for extracting the communication route information contained in the second OAM loopback cell returned from the second returning and relaying means 2b and updating and storing the communication route information.

The ATM network comprises the communication devices 1, 2, 3, . . . , and a maintenance terminal 4 is connected to the communication device 1. It is assumed that the network management function is performed from the maintenance terminal 4. In order for the communication device 1 to recognize the communication route made up of the communication devices 1, 2, 3, . . . , the first OAM loopback cell delivering means 1a delivers a first OAM loopback cell for recognizing the communication route to a route terminal point. The communication devices 2, 3 are identical in structure to each other, and the first and second returning and relaying means 2a, 2b are disposed in either of these communication devices.

When the first returning and relaying means 2a in the communication device 2 receives the first OAM loopback cell, the first returning and relaying means 2a adds its own location ID to the received first OAM loopback cell, and returns the received first OAM loopback cell together with the added location ID to the communication route recognizing means 1b in the communication device 1 which is the source, and also relays the received first OAM loopback cell to the next communication device 3. The first returning and relaying means in the communication device 3 which receives the first OAM loopback cell operates in the same fashion. To the communication route recognizing means 1b in the communication device 1, therefore, there have been returned first OAM loopback cells together with respective location IDs of the communication devices 2, 3, . . . added thereto. The communication route recognizing means 1b then analyzes the first OAM loopback cells returned from the respective first returning and relaying means to recognize the state of the communication route.

In the event of a circuit disconnection in the communication route, first OAM loopback cells are returned from those communication devices up to the circuit disconnection. Consequently, it is possible to recognize the communication route up to the circuit disconnection. If a sequence number which can be updated each time it is relayed by a communication device is added to the first OAM loopback cell, then the communication route can be recognized in greater detail and the fault location can also be identified by combining the sequence number and the returned location IDs of communication devices.

When the communication device 1 is to collect communication route information of the communication route made up of the communication devices 1, 2, 3, . . . , the second OAM loopback cell delivering means 1c delivers a second OAM loopback cell to the route terminal point. The communication route information includes traffic information, performance monitoring information, and congestion information.

When the second returning and relaying means 2b in the communication device 2 receives the second OAM loopback cell, the second returning and relaying means 2b adds its communication route information to the received second OAM loopback cell, and returns the received second OAM loopback cell together with the added communication route information to the communication route recognizing means 1d in the communication device 1 which is the source, and also relays the received second OAM loopback cell to the next communication device 3. The second returning and relaying means in the communication device 3 which receives the second OAM loopback cell operates in the same fashion. To the communication route recognizing means 1d in the communication device 1, therefore, there are returned second OAM loopback cells together with respective communication route information added thereto. The communication route recognizing means 1d then extracts the communication route information added to the second OAM loopback cells returned from the respective second returning and relaying means, and updates and stores the communication route information.

Consequently, even in networks which are not equipped with operation systems, communication devices which perform a network management function can recognize traffic information, performance monitoring information, and congestion information. The communication route information thus recognized allows the ATM network communication route monitoring system to identify the cause of a fault in the communication route and also to take countermeasures against faults which occur intermittently. In addition, based on the communication route information, the ATM network communication route monitoring system can detect a communication fault and automatically indicate the communication fault to the service personnel.

The ATM network communication route monitoring system according to the first embodiment of the present invention will be described in greater detail below.

Figure 2:
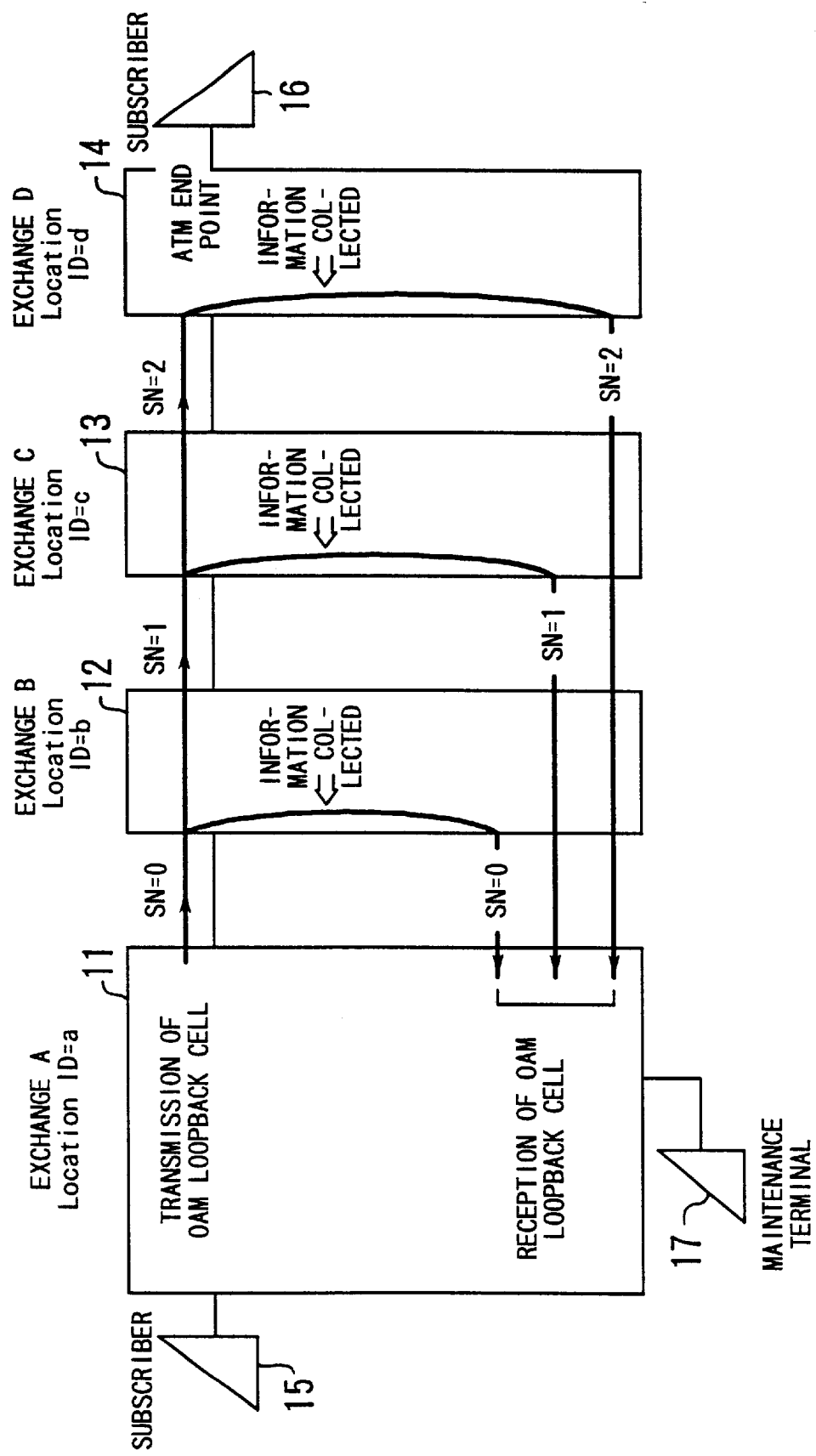
FIG. 2 is a block diagram of an ATM network of point-to-point paths which incorporates an ATM network communication route monitoring system according to the first embodiment of the present invention.

FIG. 2 shows in block form the ATM network of point-to-point paths which incorporates the ATM network communication route monitoring system according to the first embodiment of the present invention. As shown in FIG. 2, the ATM network includes a plurality of exchanges (A~D) 11~14 connected in cascade. A maintenance terminal 17 is connected to the exchange (A) 11, and controls the exchange (A) 11 to perform a network management function. It is assumed that the exchanges (A~D) 11~14 have respective location IDs a~d. Many subscriber's terminals are connected to each of the exchanges (A~D) 11~14. In FIG. 2, only subscriber's terminals 15, 16 are shown as being connected respectively to the exchanges (A) 11, (D) 14. While the exchanges are illustrated as NEs (Network Elements) in FIG. 2, various other communication devices that make up the network, e.g., cross-connect communication devices, may be employed as NEs.

If a subscriber's communication path is established from the exchange (A) 11 to the exchange (D) 14 and it is to be inspected for its route, then the exchange (A) 11 transmits an OAM loopback cell (end-to-end loopback cell) to the exchange (D) 14 which is an end point (ATM terminal point) of the communication path. Any exchanges can transmit an OAM loopback cell provided a maintenance terminal is connected thereto.

The OAM loopback cell from the exchange (A) 11 is transmitted through the exchange (B) 12 and the exchange (C) 13 to the exchange (D) 14. When each of the exchanges (B) 12, (C) 13, (D) 14 receives the OAM loopback cell, it adds its own location ID and communication route information, which is requested to be transmitted, to predetermined areas of the OAM loopback cell, and returns the OAM loopback cell to the exchange (A) 11 which is the source. Furthermore, each exchange increments a sequence number (SN) contained in the OAM loopback cell, and relays the OAM loopback cell to a next exchange. Upon reception of the OAM loopback cell returned from the exchange (D) 14 at the end point, the exchange (A) 11 ends its standby mode for receiving OAM loopback cells returned in response to the transmitted OAM loopback cell, and effects various processing modes, i.e., recognizes the communication route, updates and stores the communication route information, detects faults, and displays the communication route information, based on the location IDs, the sequence numbers, the communication route information, etc. contained in the returned OAM loopback cells.

Figure 3:
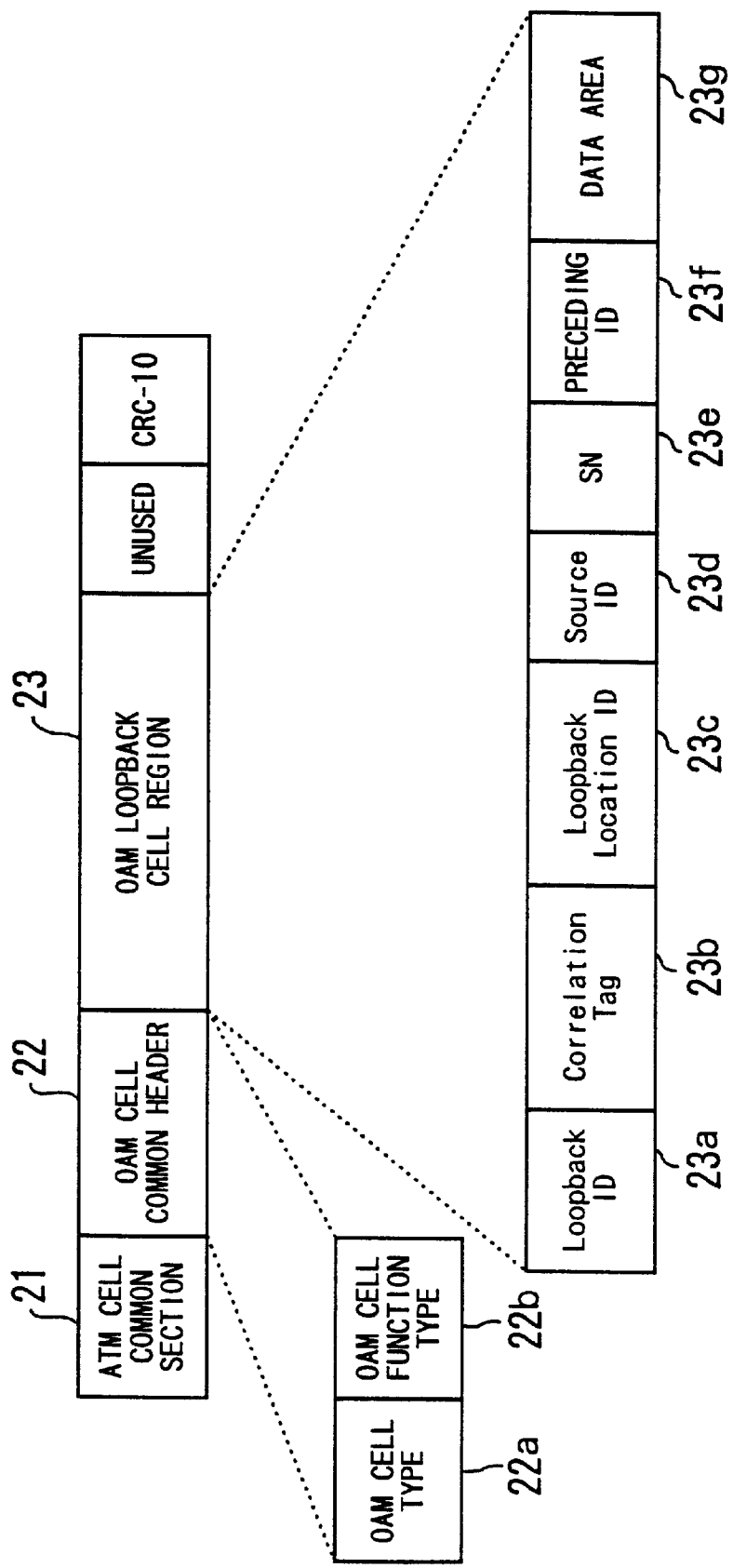
FIG. 3 is a diagram of the format of an OAM loopback cell used in the present invention.

FIG. 3 shows the format of an OAM loopback cell used in the present invention. As shown in FIG. 3, the OAM loopback cell comprises an "ATM cell common section" column 21, an "OAM cell common header" column 22, and an "OAM loopback cell region" column 23, etc. The "OAM cell common header" column 22 comprises an "OAM cell type" column 22a and an "OAM cell function type" column 22b. The "OAM cell function type" column 22b contains data representative of either one of "loopback", "inquiry about all exchanges on path route", and "information collection on path route". If the "OAM cell function type" column 22b contains information which is representative of "information collection on path route", then either one of "traffic information", "performance monitoring information collection", and "congestion information collection" is added thereto.

The "OAM loopback cell region" column 23 includes a "loopback ID" column 23a, a "correlation tag" column 23b, a "loopback location ID" column 23c, a "source ID" column 23d, a "sequence number (SN)" column 23e, a "preceding loopback location ID" column 23f, and a "data area" column 23g. The "loopback ID" column 23a contains information which is representative of where the OAM loopback cell is transmitted downstream from the source to the end point or upstream from the end point to the source. The "correlation tag" column 23b contains information used to distinguish between many OAM loopback cells that are simultaneously present on the path being inspected for its route. The "loopback location ID" column 23c contains the location ID of an exchange which has returned the OAM loopback cell. The "source ID" column 23d contains the location ID a of the source exchange (A) 11 which has transmitted the OAM loopback cell. The "sequence number" column 23e is set to a value 0 by the exchange (A) 11, and incremented by 1 each time the OAM loopback cell is relayed by an exchange. Based on the information contained in the "sequence number" column 23e, the source exchange (A) 11 which has received the OAM loopback cell can recognize which exchange has relayed the OAM loopback cell. The "preceding loopback location ID" column 23f contains the location ID of a preceding exchange which is recorded by the exchange that returns the OAM loopback cell. The location ID of the preceding exchange is used to determine a storage position when the source exchange (A) 11 stores the received information in a memory. The "data area" column 23g contains either one of traffic information, performance monitoring information, and congestion information which is recorded by the exchange that returns the OAM loopback cell.

Figure 4:
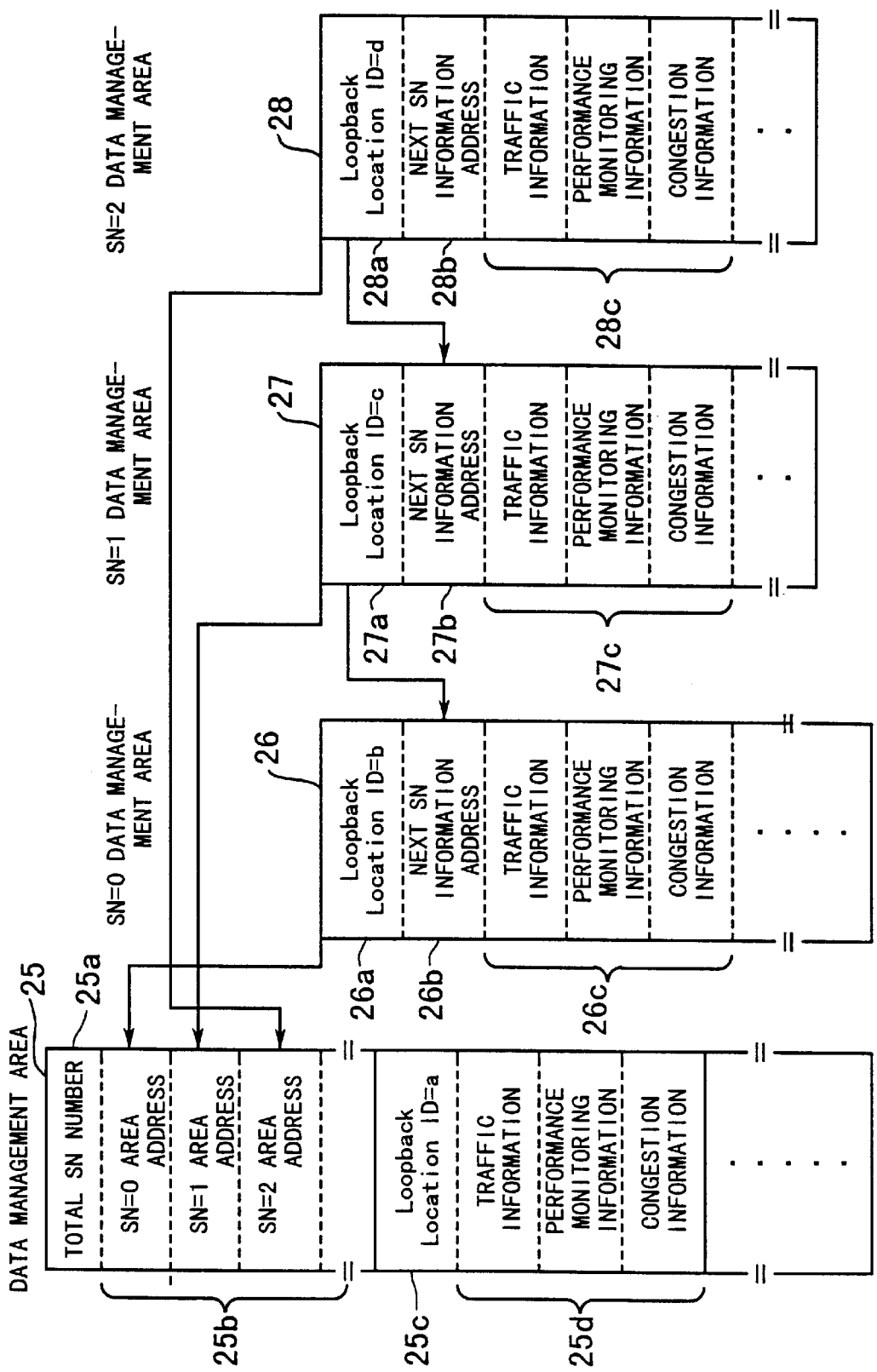
FIG. 4 is a diagram showing a process of storing data in an exchange which is a source in the ATM network shown in FIG. 2.

FIG. 4 shows a process of storing data in the source exchange (A) 11. A number of OAM loopback cells are returned to the exchange (A) 11. Data management areas for respective sequence numbers (SN) are provided for storing various data contained in those OAM loopback cells into the memory. Specifically, the data management areas include a data management area 25, an SN=0 data management area 26, an SN=1 data management area 27, and an SN=2 data management area 28. If more exchanges than those shown in FIG. 2 are involved, then the number of data management areas used is increased in proportion to the number of the exchanges.

The data management area 25 has a "total SN number" column 25a, an "area address" column 25b, a "loopback location ID" column 25c, and a "various information" column 25d. The "total SN number" column 25a contains the number of exchanges that return the OAM loopback cell on the path being inspected for its route. The "area address" column 25b has an "SN=0 area address" column which contains the address of a leading position in the SN=0 data management area 26, an "SN=1 area address" column which contains the address of a leading position in the SN=1 data management area 27, and an "SN=2 area address" column which contains the address of a leading position in the SN=2 data management area 28. The "loopback location ID" column 25c contains the location ID a of the source exchange (A) 11. If there are a plurality of paths to be inspected for its route (only one path to be inspected is shown in FIG. 2), then the "total SN number" column 25a and the "area address" column 25b are provided for each of the paths to store data of the respective paths. These columns which are provided for the respective paths are assigned respective path identification numbers. The "various information" column 25d stores in respective positions traffic information, performance monitoring information, and congestion information.

The SN=0 data management area 26 has a "loopback location ID" column 26a, a "next SN information address" column 26b, and "various information" column 26c. The "loopback location ID" column 26a contains the location ID b of the exchange (B) 12 which follows the source exchange (A) 11. The "next SN information address" column 26b contains the address of the leading position in the SN=1 data management area 27. The "various information" column 26c stores in respective positions traffic information, performance monitoring information, and congestion information which are contained in the OAM loopback cell returned with the sequence number SN=0. If there are a plurality of paths to be inspected for its route, then since the OAM loopback cell returned with the sequence number SN=0 exists for each of the paths, the "various information" column 26c is provided for each of the paths, and stores the information for each of the paths.

As is the case with the SN=0 data management area 26, the SN=1 data management area 27 has a "loopback location ID" column 27a, a "next SN information address" column 27b, and "various information" column 27c. The "loopback location ID" column 27a contains the location ID c of the exchange (C) 13 which follows the exchange (B) 12. The "next SN information address" column 27b contains the address of the leading position in the SN=2 data management area 28. The "various information" column 27c stores in respective positions traffic information, performance monitoring information, and congestion information which are contained in the OAM loopback cell returned with the sequence number SN=1. If there are a plurality of paths to be inspected for its route, then since the OAM loopback cell returned with the sequence number SN=1 exists for each of the paths, the "various information" column 27c is provided for each of the paths, and stores the information for each of the paths.

As is the case with the SN=0 data management area 26, the SN=2 data management area 28 has a "loopback location ID" column 28a, a "next SN information address" column 28b, and "various information" column 28c. The "loopback location ID" column 28a contains the location ID d of the exchange (D) 14 which follows the exchange (C) 13. The "next SN information address" column 28b contains nothing because there is no SN=3 data management area in this case. The "various information" column 28c stores in respective positions traffic information, performance monitoring information, and congestion information which are contained in the OAM loopback cell returned with the sequence number SN=2. If there are a plurality of paths to be inspected for its route, then since the OAM loopback cell returned with the sequence number SN=2 exists for each of the paths, the "various information" column 28c is provided for each of the paths, and stores the information for each of the paths.

Figure 5:
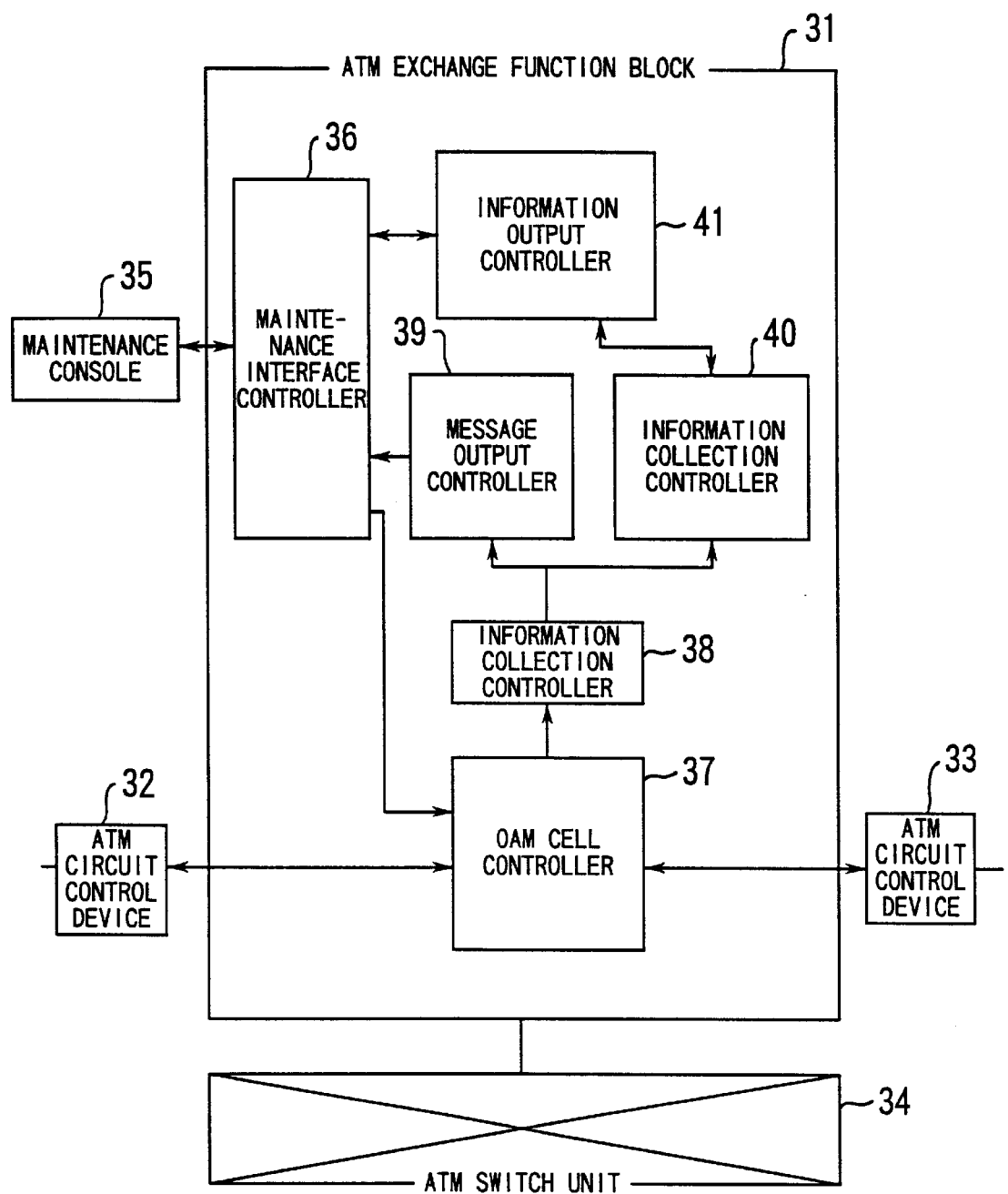
FIG. 5 is a block diagram of an internal structure of an exchange.

FIG. 5 shows in block form an internal structure of an exchange. Each of the exchanges (A~D) 11~14 shown in FIG. 2 has the internal structure shown in FIG. 5. However, the components of the internal structure are used differently depending on whether the exchange is a source exchange that is required to perform the network management function or not.

The exchange basically comprises an ATM exchange function block 31 and a pair of ATM circuit control devices 32, 33, each of which is implemented by a processor including a CPU, memories, etc. The ATM exchange function block 31 comprises a maintenance interface controller 36, an OAM cell controller 37, an information collection controller 38, a message output controller 39, an information collection controller 40, and an information output controller 41. These controllers will be described later on. If the exchange is an exchange that is required to perform the network management function, then the ATM circuit control devices 32, 33 transmit an OAM loopback cell and receive returned OAM loopback cells. If the exchange is not an exchange that is required to perform the network management function, then the ATM circuit control devices 32, 33 receive an OAM loopback cell, add its own location ID and requested communication route information to the OAM loopback cell, and returns the OAM loopback cell. An ATM switch unit 34 connected to the ATM exchange function block 31 the serves to route ATM cells based on routing information carried by the ATM cells. A maintenance console 35 connected to the ATM exchange function block 31 corresponds to the maintenance terminal 17 shown in FIG. 2.

It is assumed that the exchange is an exchange that is required to perform the network management function and the maintenance console 35 instructs the ATM exchange function block 31 through the maintenance interface controller 36 to recognize a communication route for a communication path designated by the maintenance console 35. The OAM cell controller 37 transmits an OAM loopback cell to the designated communication path. The OAM cell controller 37 also receive OAM loopback cells sent from the ATM circuit control devices 32, 33 and processes information contained in the received OAM loopback cells.

If the exchange is an exchange that is required to perform the network management function, then the information collection controller 38 extracts sequence numbers and location IDs from the returned OAM loopback cells, and derive from the extracted sequence numbers and location IDs which data management area is to store information. The information collection controller 38 is also capable of analyzing received communication route information. In the event of a communication route fault, the information collection controller 38 outputs alarm information to the message output controller 39.

If the exchange is an exchange that is required to perform the network management function, then the message output controller 39 edits a message based on alarm information received from the information collection controller 38, and delivers the edited message autonomously to the service personnel.

If the exchange is an exchange that is required to perform the network management function, then the information collection controller 40 receives traffic information, performance monitoring information, and congestion information indicated by returned OAM loopback cells, through the information collection controller 38, and writes the received information into the memory. When the service personnel enters an inquiry about information, the information collection controller 40 reads the inquired information.

If the exchange is an exchange that is required to perform the network management function, then when the service personnel enters a request to ask for information from the maintenance console 35, the information output controller 41 receives the request through the maintenance interface controller 36. The information output controller 41 asks the information collection controller 40 for the information, edits the obtained information, and transfers the edited information through the maintenance interface controller 36 to the maintenance console 35, which then displays the information.

Figure 6:
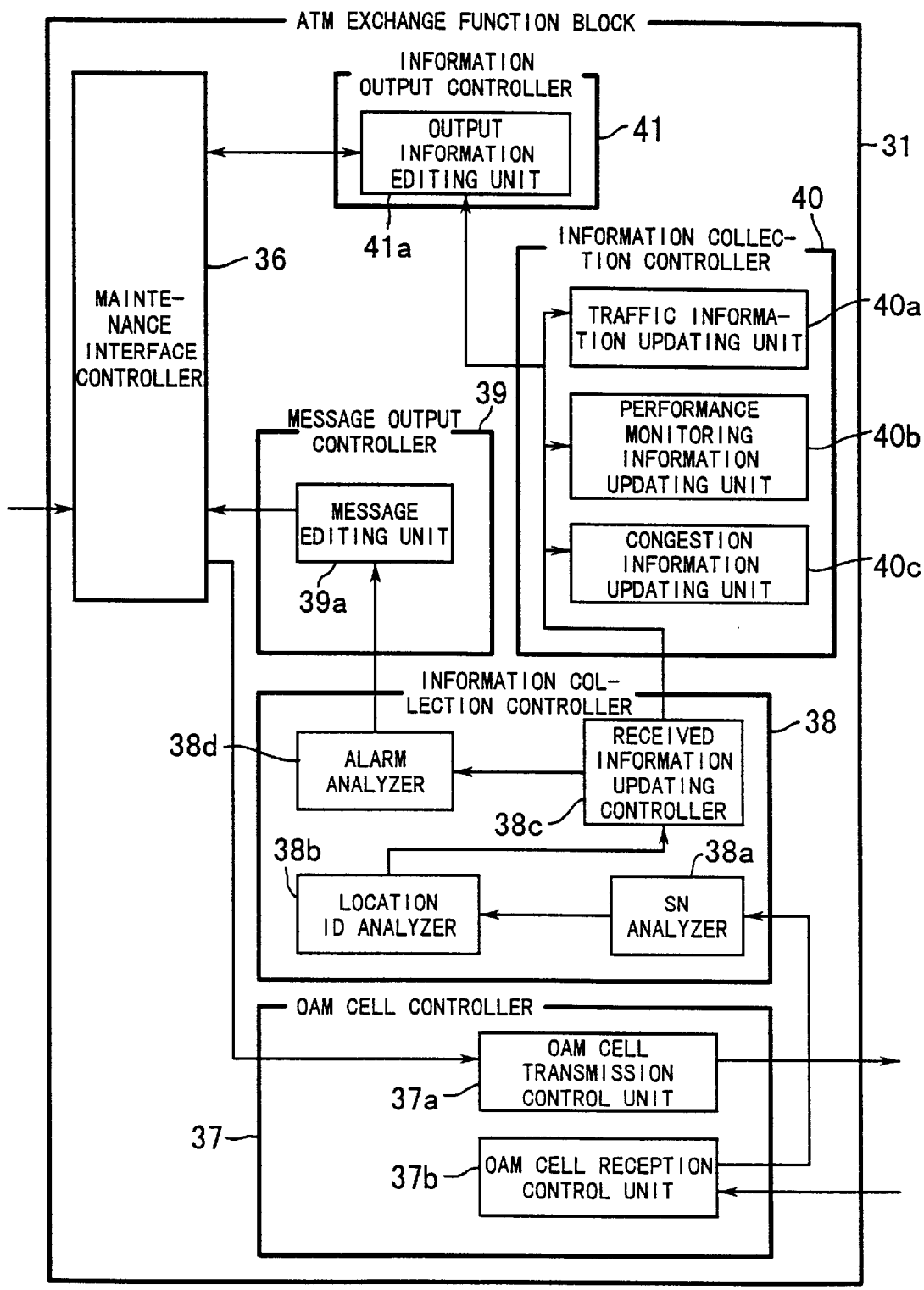
FIG. 6 is a block diagram of an internal structure of an ATM exchange function block of the exchange shown in FIG. 5.

FIG. 6 shows in block form an internal structure of the ATM exchange function block 31. As shown in FIG. 6, the information collection controller 38 comprises an SN analyzer 38a, a location ID analyzer 38b, a received information updating controller 38c, and an alarm analyzer 38d. The information collection controller 40 comprises a traffic information updating unit 40a, a performance monitoring information updating unit 40b, and a congestion information updating unit 40c. The message output controller 39 comprises a message editing unit 39a. The OAM cell controller 37 comprises an OAM cell transmission control unit 37a and an OAM cell reception control unit 37b. The information output controller 41 comprises an output information editing unit 41a.

Figure 7:
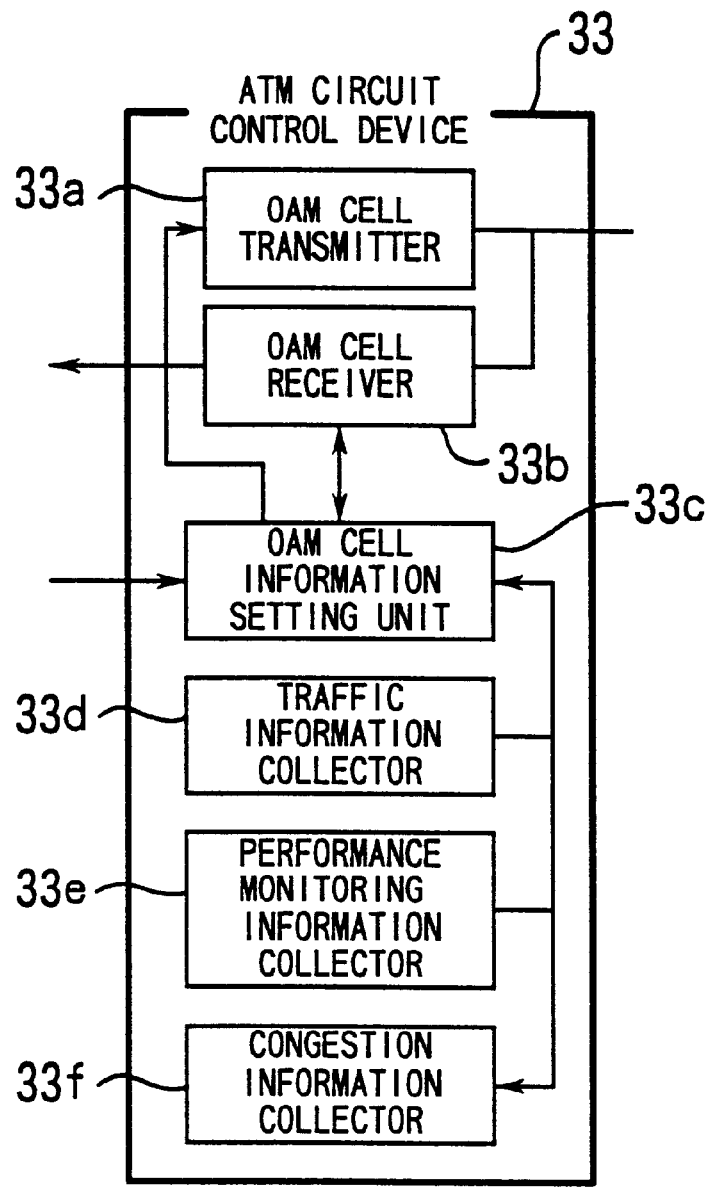
FIG. 7 is a block diagram of an internal structure of an ATM circuit control device of the exchange shown in FIG. 5.

FIG. 7 shows in block form an internal structure of the ATM circuit control device 33. The ATM circuit control device 32 has an internal structure which is the same as the internal structure of the ATM circuit control device 33.

The ATM circuit control device 33 comprises an OAM cell transmitter 33a, an OAM cell receiver 33b, an OAM cell information setting unit 33c, a traffic information collector 33d, a performance monitoring information collector 33e, and a congestion information collector 33f. An output from the OAM cell receiver 33b is sent to the OAM cell reception control unit 37b shown in FIG. 6, and an output from the OAM cell transmission control unit 37a shown in FIG. 6 is sent to the OAM cell information setting unit 33c.

The components shown in FIGS. 6 and 7 will be referred to in an entire operation sequence of the ATM network communication route monitoring system which will be described below with reference to various sequence diagrams.

Figure 8:
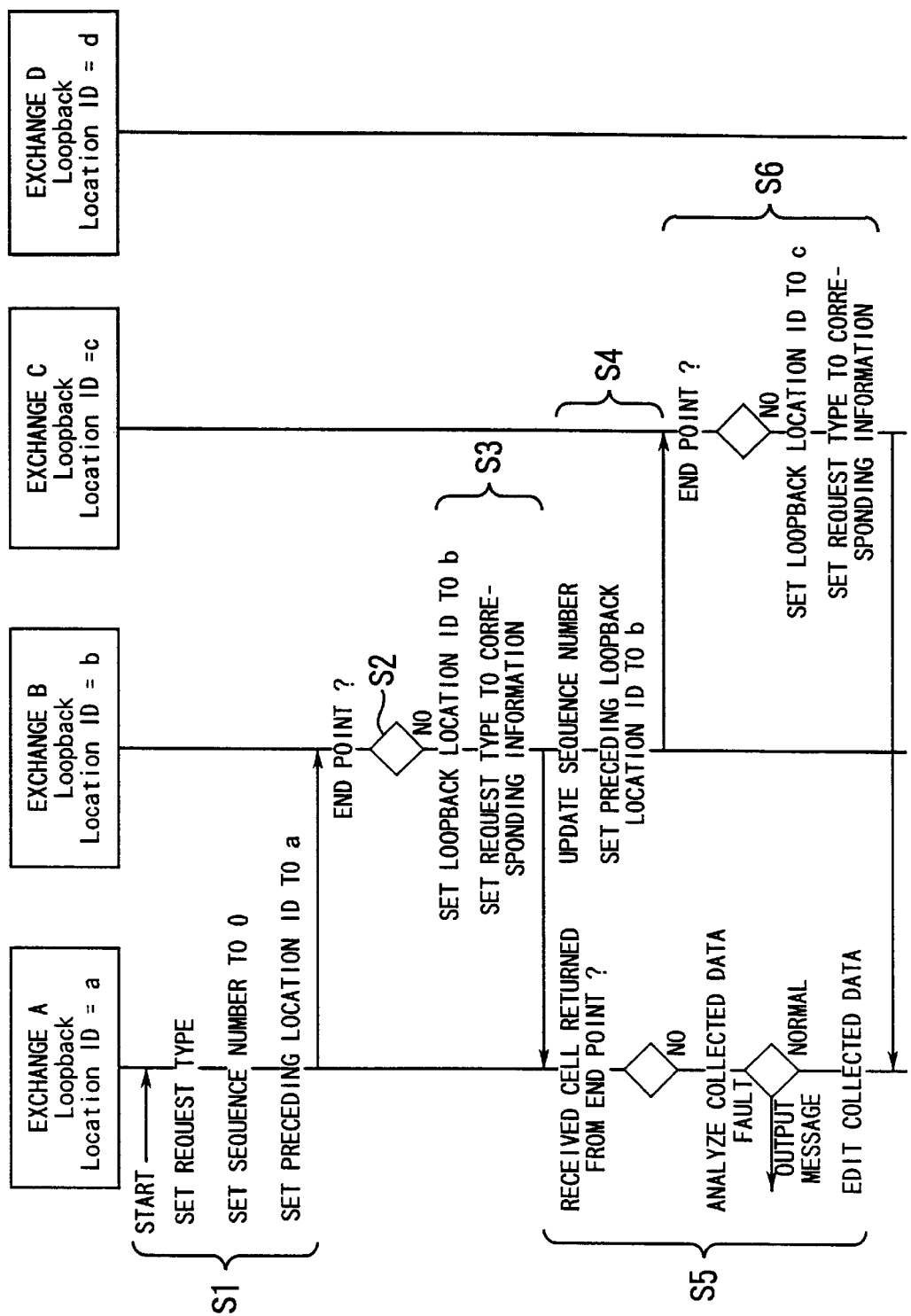
FIG. 8 is a sequence diagram showing a former portion of a processing sequence of exchanges upon transmission and reception of OAM loopback cells in the ATM network shown in FIG. 2, at the time the OAM loopback cells are transmitted and received normally.
Figure 9:
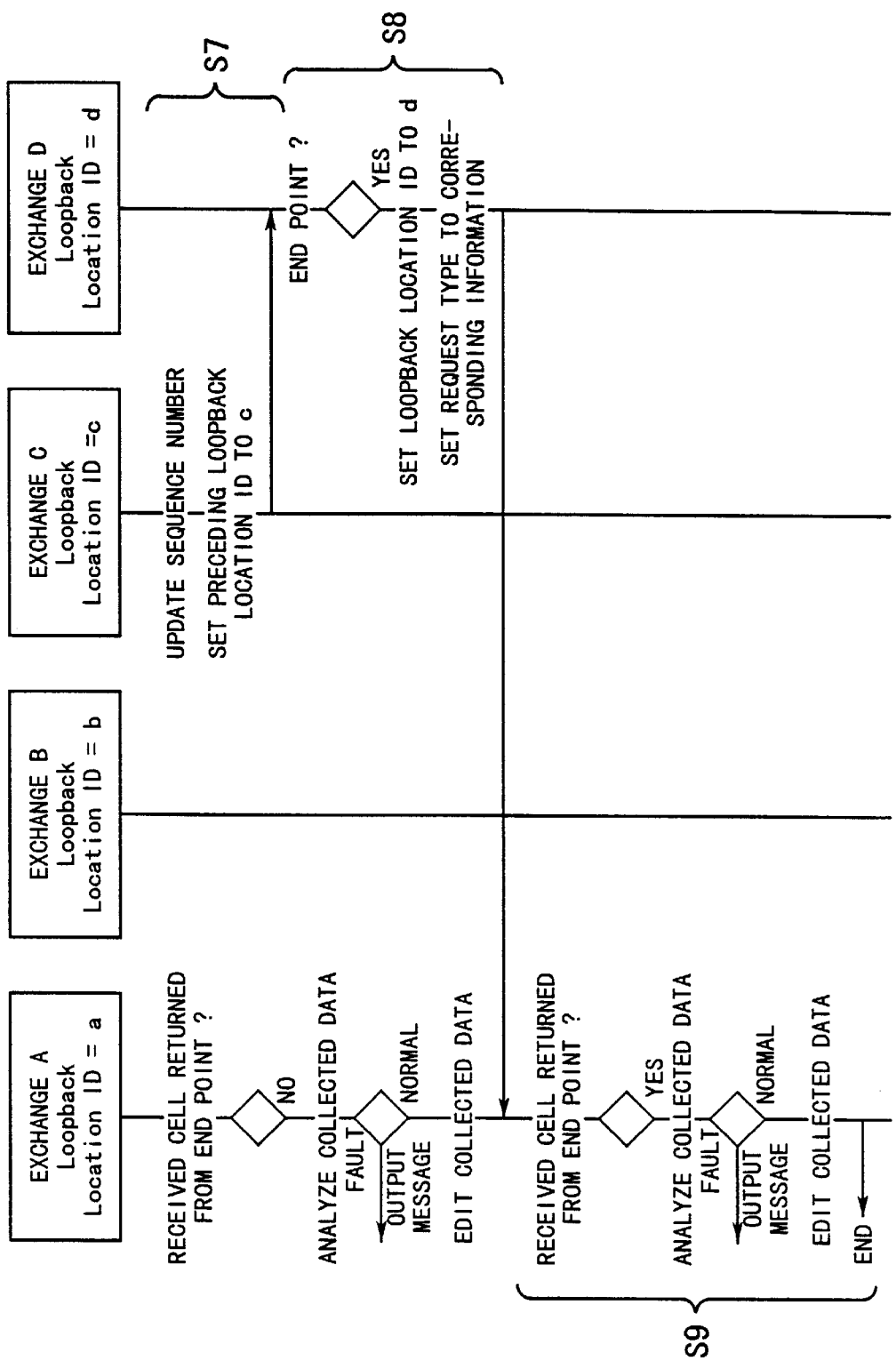
FIG. 9 is a sequence diagram showing a latter portion of the processing sequence of exchanges upon transmission and reception of OAM loopback cells in the ATM network shown in FIG. 2, at the time the OAM loopback cells are transmitted and received normally.

FIGS. 8 and 9 show a processing sequence of exchanges upon transmission and reception of OAM loopback cells in the ATM network shown in FIG. 2, at the time the OAM loopback cells are transmitted and received normally. FIG. 8 illustrates a former portion of the processing sequence, and FIG. 9 illustrates a latter portion of the processing sequence. Step numbers indicated by numbers preceded by a prefix S shown in FIGS. 8 and 9 will be referred to in the description of the processing sequence which follows.

When the exchange A receives a request to start an OAM loopback cell test with a communication path and a request type being designated from the service personnel, the exchange A transmits an end-to-end OAM loopback cell to the indicated communication path. Specifically, the exchange A sets the designated request type ("inquiry about all exchanges on path route" or "information collection on path route") in the "OAM cell function type" column 22b of an OAM loopback cell, sets a value of 0 in the "sequence number" column 23e of the OAM loopback cell, sets its own location ID a in the "preceding loopback location ID" column 23f of the OAM loopback cell, and transmits the OAM loopback cell to the exchange B (S1).

If the exchange B recognizes that the received OAM loopback cell is an end-to-end OAM loopback cell, then the exchange B ascertains whether the exchange B itself is an exchange at the end point or not (S2). Since the exchange B is not an exchange at the end point, the exchange B returns the OAM loopback cell to the exchange A. Specifically, the exchange B sets its own location ID b in the "loopback location ID" column 23c of the OAM loopback cell, sets information corresponding to the request type set in the "OAM cell function type" column 22b of the OAM loopback cell in the OAM loopback cell, and transmits the OAM loopback cell to the exchange A (S3). Because the exchange B is not an exchange at the end point, the exchange B needs to transmit the OAM loopback cell to the exchange C. The exchange B updates the location ID a set in the "preceding loopback location ID" column 23f of the OAM loopback cell into its own location ID b, updates the value of 0 set in the "sequence number" column 23e into a value of 1, and transmits the OAM loopback cell to the exchange C (S4).

The exchange A ascertains whether the OAM loopback cell received from the exchange B is returned from the end point or not. Since the OAM loopback cell received from the exchange B is not returned from the end point, the exchange A judges that it will continuously receive OAM loopback cells returned in response to the OAM loopback cell transmitted in the step S1, and keeps itself in a standby mode for receiving OAM loopback cells. The exchange A analyzes the information contained in the received OAM loopback cell according to the request type set in the "OAM cell function type" column 22b. If the exchange A detects a fault, then the exchange A outputs a message to the service personnel. After having analyzed the information, the exchange A edits and stores the collected information (S5).

The exchange C operates in the same manner as the exchange B based on the OAM loopback cell received from the exchange B. The exchange C returns the OAM loopback cell to the exchange A. Specifically, the exchange C sets its own location ID c in the "loopback location ID" column 23c of the OAM loopback cell, sets information corresponding to the request type set in the "OAM cell function type" column 22b of the OAM loopback cell in the OAM loopback cell, and transmits the OAM loopback cell to the exchange A (S6). When intermediate exchanges relay the returned OAM loopback cell, they do not add new information to the OAM loopback cell and do not change the information contained in the OAM loopback cell. For example, those intermediate exchanges do not update the value in the "sequence number" column 23e. In relaying the returned OAM loopback cell with intermediate exchanges as described below, the intermediate exchanges operate in the same manner as described above.

The exchange C updates the location ID b set in the "preceding loopback location ID" column 23f of the OAM loopback cell into its own location ID c, updates the value of 1 set in the "sequence number" column 23e into a value of 2, and transmits the OAM loopback cell to the exchange D (S7).

The exchange D returns the OAM loopback cell to the exchange A. Specifically, the exchange D sets its own location ID d in the "loopback location ID" column 23c of the OAM loopback cell, sets information corresponding to the request type set in the "OAM cell function type" column 22b of the OAM loopback cell in the OAM loopback cell, and transmits the OAM loopback cell to the exchange A (S8). Inasmuch as the exchange D is located at the end point, the exchange D does not relay the OAM loopback cell to another loopback cell.

The exchange A receives the OAM loopback cell returned from the exchange D. If the exchange A decides that the received OAM loopback cell has been returned from the exchange D, then the exchange A cancels the standby mode for receiving OAM loopback cells in response to the OAM loopback cell transmitted in the step S1. The exchange A analyzes and edits the transmitted information contained in the received OAM loopback cells, and indicates to the service personnel that the OAM loopback cell test is finished (S9).

Operation of the ATM network communication route monitoring system when the request type in the "OAM cell function type" column 22b is set to "inquiry about all exchanges on path route" and also when the request type in the "OAM cell function type" column 22b is set to "information collection on path route" will be described below.

First, operation of the ATM network communication route monitoring system when the request type in the "OAM cell function type" column 22b is set to "inquiry about all exchanges on path route" will be described below.

In FIG. 2, when the service personnel instructs the exchange (A) 11 through the maintenance terminal 17 to recognize the path route from the exchange (A) 11 to the exchange (D) 14, the exchange (A) 11 transmits an OAM loopback cell with "end to end cell" set in the "ATM cell common section" column 21 and "inquiry about all exchanges on path route" set in the "OAM cell function type" column 22b to the exchange (D) 14 at the end point.

Specifically, in FIGS. 5~7, the maintenance console 35 sends maintenance interface information to the maintenance interface controller 36 of the ATM exchange function block 31, and the maintenance interface controller 36 sends an OAM cell transmission request to the OAM cell transmission control unit 37a of the OAM cell controller 37. The OAM cell transmission control unit 37a transmits an OAM cell transmission request to the OAM cell information setting unit 33c of the ATM circuit control device 33. In response to the OAM cell transmission request, the OAM cell information setting unit 33c sets "end to end cell" in the "ATM cell common section" column 21 of an OAM loopback cell, sets "inquiry about all exchanges on path route" in the "OAM cell function type" column 22b of the OAM loopback cell, and sends an OAM cell transmission request with respect to the OAM loopback cell to the OAM cell transmitter 33a. The OAM cell transmitter 33a then transmits the OAM loopback cell to the path route.

Operation of the exchange (B) 12 which has received the transmitted OAM loopback cell will be described below with reference to FIGS. 5~7. It is assumed that the OAM cell receiver 33b of the ATM circuit control device 33 has received the OAM loopback cell from the path route. The OAM cell receiver 33b sends an OAM cell information setting request to the OAM cell information setting unit 33c. In response to the OAM cell information setting request, the OAM cell information setting unit 33c sets the location ID b of the exchange (B) 12 in the "loopback location ID" column 23c of the OAM loopback cell, sets "segment cell" in the "OAM cell type" column 22a of the "OAM cell common header" column 22 of the OAM loopback cell because the exchange (B) 12 is not at the end point, and sends an OAM cell transmission request with respect to this OAM loopback cell to the OAM cell transmitter 33a. The OAM cell transmitter 33a transmits the OAM loopback cell to the source exchange (A) 11. Inasmuch as the exchange (B) 12 is not at the end point of the communication path, the OAM cell information setting unit 33c updates the value in the "sequence number (SN)" column 23e of the OAM loopback cell transmitted from the exchange (A) 11, and operates the OAM cell transmitter 33a to transmit the OAM loopback cell to the next exchange (C) 13.

The exchange (C) 13 which has received the OAM loopback cell operates basically in the same manner as the exchange (B) 12.

Operation of the exchange (D) 14 will be described below with reference to FIGS. 5~7. Because the exchange (D) 14 is at the end point of the communication path, the OAM cell information setting unit 33c sets "end to end cell" in the "OAM cell type" column 22a of the "OAM cell common header" column 22 of the OAM loopback cell to be returned, and operates the OAM cell transmitter 33a to return the OAM loopback cell to the source exchange (A)

Operation of the exchange (A) 11 will be described below with reference to FIGS. 5~7. When the OAM cell receiver 33b receives the OAM loopback cells returned from the respective exchanges (B~D) 12~14, the OAM cell receiver 33b sends an OAM cell reception notice to the OAM cell reception control unit 37b of the ATM exchange function block 31. If "inquiry about all exchanges on path route" is set in the "OAM cell function type" column 22b of the received OAM loopback cell, then the OAM cell reception control unit 37b sends a received cell analysis request to the information collection controller 38. The SN analyzer 38a and the location ID analyzer 38b of the information collection controller 38 extract the sequence numbers and the location IDs of exchanges that are contained in the OAM loopback cells, and send the sequence numbers and the location IDs to the received information updating controller 38c for storage. The "OAM cell type" column 22a of the OAM loopback cells returned from the exchanges (B, C) 12, 13 is set to "segment cell". When these OAM loopback cells are received, the information collection controller 38 waits for the reception of a next OAM loopback cell. The "OAM cell type" column 22a of the OAM loopback cell returned from the exchange (D) 14 is set to "end to end cell". When this OAM loopback cell is received, the information collection controller 38 ends the collection of information about the communication path being inspected.

The received information updating controller 38c stores the sequence numbers and the location IDs of exchanges. The stored location IDs identify the exchanges, and the magnitudes of the sequence numbers recognizes the sequence of the exchanges. Therefore, the exchanges that are actually present on the communication route and the sequence of those exchanges can be recognized. Even when the circuit interconnecting the exchanges suffers a disconnection, since OAM loopback cells are returned from those exchanges which are positioned up to the disconnection, the exchange (A) 11 that performs the network management function is able to identify those exchanges which are positioned up to the disconnection and recognize the sequence of the exchanges regardless of the disconnection. Those exchanges can be identified and their sequence can be recognized without the need for an operation system (OpS) which would otherwise manage the network. An exchange that has not returned the OAM loopback cell can be identified on the basis of lack of a sequence number among a series of sequence numbers.

Now, operation of the ATM network communication route monitoring system when the request type in the "OAM cell function type" column 22b is set to "information collection on path route" will be described below.

In FIG. 2, when the service personnel instructs the exchange (A) 11 through the maintenance terminal 17 to obtain communication route information collected by the exchanges (B~D) 12~14, the exchange (A) 11 transmits an OAM loopback cell with "end to end cell" set in the "ATM cell common section" column 21 and "information collection on path route" set in the "OAM cell function type" column 22b to the exchange (D) 14 at the end point.

Processing sequences for collecting traffic information, performance monitoring information, and congestion information will be described below.

The processing sequence for collecting traffic information will first be described below.

Each of the exchanges periodically collects traffic information with the ATM circuit control device 33. The traffic information corresponds to information about the number of user cells passed on a communication path of a PVC (Permanent Virtual Connection) or an SVC (Switched Virtual Connection) which the user is used for communications. It is possible to recognize the development of an overloaded state by collecting the traffic information.

Specifically, the exchange (A) 11 transmits an OAM loopback cell with "end to end cell" set in the "ATM cell common section" column 21 and "information collection on path route (traffic information collection)" set in the "OAM cell function type" column 22b to the exchange (D) 14 at the end point. The exchange (A) 11 transmits the OAM loopback cell basically in the same manner as described above for recognizing the communication route.

Operation of the exchange (B) 12 which has received the transmitted OAM loopback cell will be described below with reference to FIGS. 5~7. When the OAM cell receiver 33b of the ATM circuit control device 33 has received the OAM loopback cell from the exchange (A) 11, the OAM cell receiver 33b sends an OAM cell information setting request to the OAM cell information setting unit 33c. In response to the OAM cell information setting request, the OAM cell information setting unit 33c sets the location ID b of the exchange (B) 12 in the "loopback location ID" column 23c of the OAM loopback cell, and sets "segment cell" in the "OAM cell type" column 22a of the "OAM cell common header" column 22 of the OAM loopback cell because the exchange (B) 12 is not at the end point. Furthermore, the OAM cell information setting unit 33c reads traffic information periodically collected by the traffic information collector 33d from the traffic information collector 33d, sets the read traffic information in the "data area" column 23g of the OAM loopback cell, and sends an OAM cell transmission request with respect to this OAM loopback cell to the OAM cell transmitter 33a. The OAM cell transmitter 33a transmits the OAM loopback cell to the source exchange (A) 11. Inasmuch as the exchange (B) 12 is not at the end point of the communication path, the OAM cell information setting unit 33c updates the value in the "sequence number (SN)" column 23e of the OAM loopback cell transmitted from the exchange (A) 11, and operates the OAM cell transmitter 33a to transmit the OAM loopback cell to the next exchange (C) 13.

The exchange (C) 13 which has received the OAM loopback cell operates basically in the same manner as the exchange (B) 12.

Operation of the exchange (D) 14 will be described below with reference to FIGS. 5~7. Because the exchange (D) 14 is at the end point of the communication path, the OAM cell information setting unit 33c sets "end to end cell" in the "OAM cell type" column 22a of the "OAM cell common headers column 22 of the OAM loopback cell to be returned, and operates the OAM cell transmitter 33a to return the OAM loopback cell to the source exchange (A)

Operation of the exchange (A) 11 will be described below with reference to FIGS. 5~7. When the OAM cell receiver 33b receives the OAM loopback cells returned from the respective exchanges (B~D) 12~14, the OAM cell receiver 33b sends an OAM cell reception notice to the OAM cell reception control unit 37b of the ATM exchange function block 31. If "information collection on path route" is set in the "OAM cell function type" column 22b of the received OAM loopback cell, then the OAM cell reception control unit 37b sends a received cell analysis request to the information collection controller 38. The SN analyzer 38a and the location ID analyzer 38b of the information collection controller 38 divide the location IDs and traffic information of exchanges that are contained in the OAM loopback cells for the respective sequence numbers. The received information updating controller 38c sends a received information updating request based on the divided location IDs and traffic information to the traffic information updating unit 40a of the information collection controller 40. Using the sequence numbers and the location IDs of the exchanges which are contained in the sent information, the traffic information updating unit 40a searches for corresponding places in the data management areas shown in FIG. 4, and stores the traffic information in those places. If information has already been stored in those places, the stored information is updated. The information is stored and updated for each of the sequence numbers.

As described above, the service personnel can collect the traffic information of the exchanges on the communication path without the need for an operation system (OpS) which would otherwise manage the network. Consequently, the service personnel can recognize the conditions in which user cells are transmitted and received and also the conditions in which the network is loaded by user cells, for thereby monitoring the quality of the communication path.

The processing sequence for collecting performance monitoring information will be described below. The performance monitoring information represents the quality of communications on the communication path, and makes it possible to identify a location of degraded quality of user cell communications.

The performance monitoring information is collected under the same principles as the traffic information. As shown in FIGS. 5~7, in each of the exchanges (B, C) 12, 13, if "information collection on path route (performance monitoring information collection)" is set in the "OAM cell function type" column 22b of the received OAM loopback cell, the OAM cell receiver 33b of the ATM circuit control device 33 sends an OAM cell information setting request to ask for performance monitoring information to the OAM cell information setting unit 33c. The OAM cell information setting unit 33c reads performance monitoring information periodically collected by the performance monitoring information collector 33e from the performance monitoring information collector 33e, sets the read performance monitoring information in the "data area" column 23g of the OAM loopback cell, and sends an OAM cell transmission request with respect to this OAM loopback cell to the OAM cell transmitter 33a. The OAM cell transmitter 33a transmits the OAM loopback cell to the source exchange (A) 11.

When the exchange (A) 11 receives the OAM loopback cell with the performance monitoring information set therein, it sends a received information updating request through the information collection controller 38 to the performance monitoring information updating unit 40b of the information collection controller 40. The performance monitoring information updating unit 40b searches for corresponding places in the data management areas shown in FIG. 4, and stores the performance monitoring information in those places.

Because the performance monitoring information contains fault generation information over a predetermined time, e.g., 5 minutes, it is possible to recognize the conditions of the communication path at the time the OAM loopback cell is transmitted and also whether intermittent faults occur or not at the time user communicates, by acquiring the performance monitoring information.

The processing sequence for congestion information will be described below. The congestion information includes the conditions in which the CPUs of the ATM circuit control devices on the communication path are loaded (CC activity ratio), memory activity ratio, communication congestion conditions, etc. A location where a congestion occurs on the communication path route can be identified by collecting these items of the congestion information. The items of the congestion information are indicated to the service personnel to avoid a communication fault due to a congestion and establish a communication path again.

The congestion information is collected under the same principles as the traffic information and the performance monitoring information. As shown in FIGS. 5~7, in each of the exchanges (B, C) 12, 13, if "information collection on path route (congestion information collection)" is set in the "OAM cell function type" column 22b of the received OAM loopback cell, the OAM cell receiver 33b of the ATM circuit control device 33 sends an OAM cell information setting request to ask for congestion information to the OAM cell information setting unit 33c. The OAM cell information setting unit 33c reads congestion information periodically collected by the congestion information collector 33f from the congestion information collector 33f, sets the read congestion information in the "data area" column 23g of the OAM loopback cell, and sends an OAM cell transmission request with respect to this OAM loopback cell to the OAM cell transmitter 33a. The OAM cell transmitter 33a transmits the OAM loopback cell to the source exchange (A) 11.

When the exchange (A) 11 receives the OAM loopback cell with the congestion information set therein, it sends a received information updating request through the information collection controller 38 to the congestion information updating unit 40c of the information collection controller 40. The congestion information updating unit 40c searches for corresponding places in the data management areas shown in FIG. 4, and stores the congestion information in those places.

By collecting the congestion information, it is possible to recognize a location of congestion on the communication path route and prompt the service personnel to review the communication route.

A process of detecting a fault, to be carried by the exchange (A) 11 which performs the network management function, will be described below.

Based on the information collected under the settings "information collection on path route (performance monitoring information collection)" and "information collection on path route (congestion information collection)", the exchange (A) 11 ascertains whether the value of the collected information exceeds a predetermined threshold or not.

If the value of the collected information exceeds the predetermined threshold, then the exchange (A) 11 sends an autonomous message indicative of a fault to the service personnel.

Specifically, as shown in FIGS. 5~7, the alarm analyzer 38d of the information collection controller 38 reads collected information stored by the received information updating controller 38c, and ascertains whether the value of the collected information exceeds a predetermined threshold or not. If the value of the collected information exceeds the predetermined threshold, then the alarm analyzer 38d decides that a fault has occurred, and sends a fault data output request to the message editing unit 39a of the message output controller 39. The message editing unit 39a edits a message based on the communication path route which is suffering the fault, the exchange which has transmitted the collected information containing the detected fault, and information indicative of the cause of the fault, and sends a message output request to the maintenance interface controller 36.

Maintenance of the network is facilitated because the results of the test using the OAM loopback cell are indicated to the service personnel and the location and cause of a fault on the communication route are also indicated to the service personnel.

A process of operation of the exchange (A) 11 which performs the network management function when the service personnel designates an arbitrary communication path through the maintenance console 35 and asks for traffic information, performance monitoring information, and congestion information that are stored by the information collection controller 40 will be described below.

As shown in FIGS. 5~7, the maintenance console 35 sends maintenance interface information including a designated communication path to the maintenance interface controller 36 of the ATM exchange function block 31, and the maintenance interface controller 36 sends an information inquiry request to the output information editing unit 41a of the information output controller 41. The designated communication path is converted into a corresponding path identification number by the output information editing unit 41a. If there are a plurality of communication paths to be inspected for its route, then the "total SN number" column 25a and the "area address" column 25b are present for each of the communication paths, and assigned each of the path identification numbers of the respective communication paths. There has been generated an association table of communication paths and path identification numbers, and the output information editing unit 41a obtains a path identification number from the association table.

The output information editing unit 41a sends a collected information inquiry request together with the obtained corresponding path identification number to the information collection controller 40. The information collection controller 40 searches the data management area shown in FIG. 4, and obtains information from the column corresponding to the sent path identification number. The information collection controller 40 also extracts information from the SN=0 data management area 26, the SN=1 data management area 27, and the SN=2 data management area 28. Therefore, the information stored with respect to the designated communication path by the information collection controller 40 is extracted. Of the extracted information, the traffic information, the performance monitoring information, and the congestion information are delivered to the requesting source (the output information editing unit 41a). The output information editing unit 41a sends the obtained information as the result of the information inquiry to the maintenance interface controller 36, which then outputs the received information as response information to the maintenance console 35.

The processing sequence of each of the exchanges at the time the OAM loopback cells are transmitted and received normally has been described above, as shown in FIGS. 8 and 9. Processing sequences of each of the exchanges at the time the OAM loopback cells are not transmitted and received normally will be described below in such cases that the transmission of OAM loopback cells suffers a fault and the reception of OAM loopback cells suffers a fault.

Figure 10:
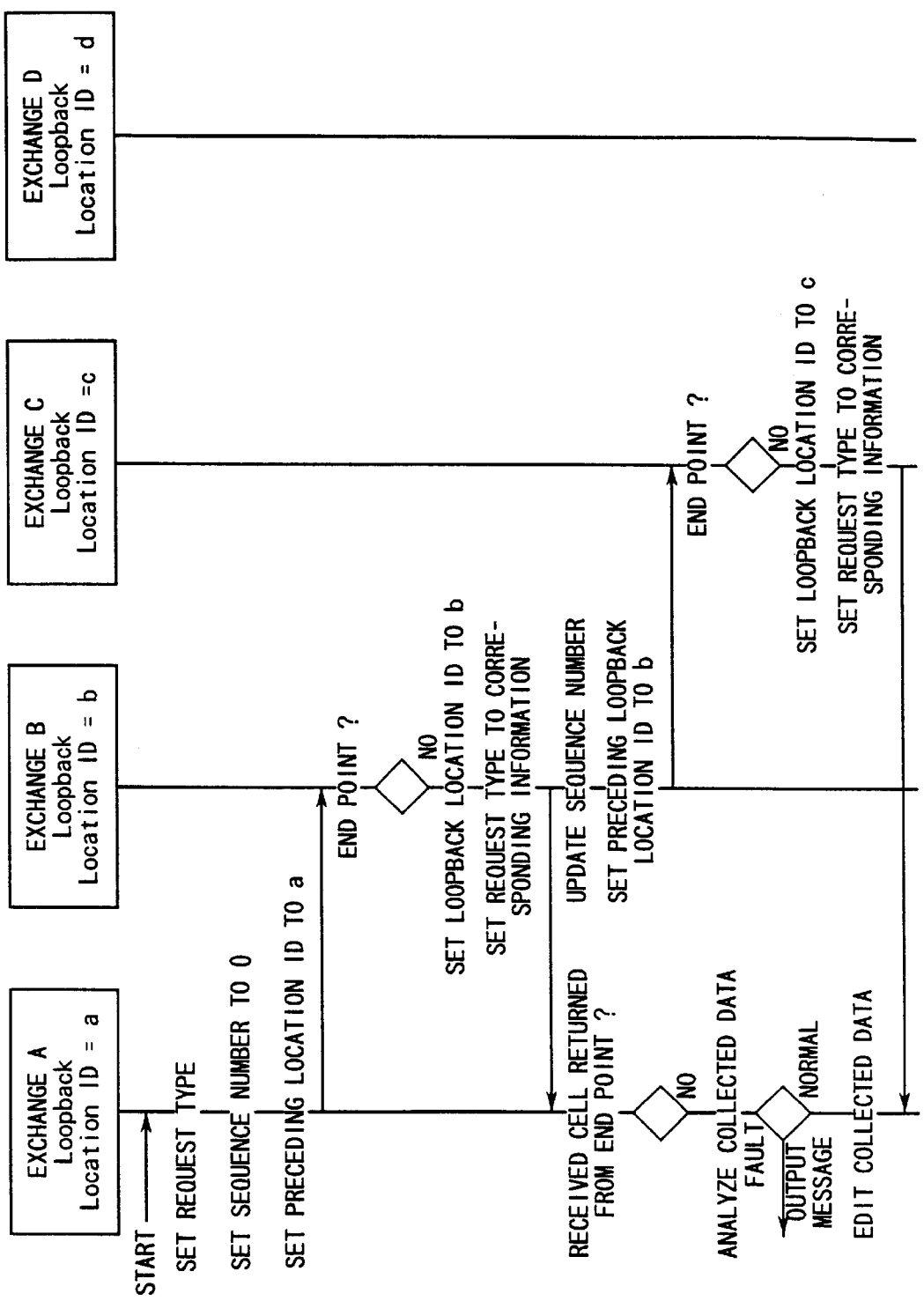
FIG. 10 is a sequence diagram showing a former portion of a processing sequence of exchanges upon transmission and reception of OAM loopback cells in the ATM network shown in FIG. 2, at the time the transmission of OAM loopback cells suffers a fault.
Figure 11:
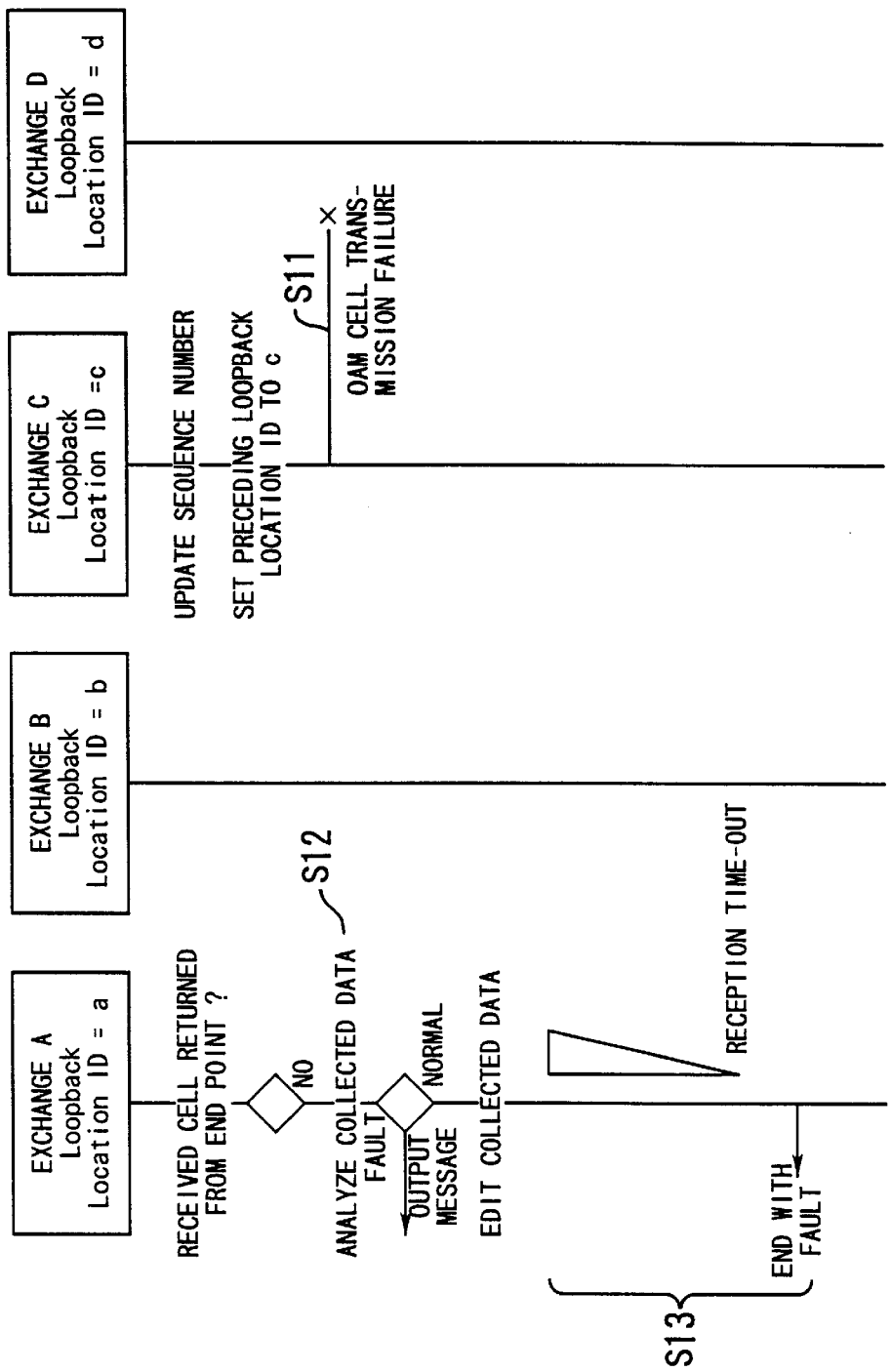
FIG. 11 is a sequence diagram showing a latter portion of the processing sequence of exchanges upon transmission and reception of OAM loopback cells in the ATM network shown in FIG. 2, at the time the transmission of OAM loopback cells suffers a fault.

FIGS. 10 and 11 show a processing sequence of exchanges upon transmission and reception of OAM loopback cells in the ATM network shown in FIG. 2, at the time the transmission of OAM loopback cells suffers a fault. Specifically, the processing sequence shown in FIGS. 10 and 11 is carried out when an OAM loopback cell cannot normally be transmitted from the exchange (C) 13 to the exchange (D) 14. FIG. 10 shows a former portion of the processing sequence, and FIG. 11 shows a latter portion of the processing sequence. Step numbers indicated by numbers preceded by a prefix S shown in FIGS. 10 and 11 will be referred to in the description of the processing sequence which follows.

An OAM loopback cell is transmitted from the exchange (A) 11 to the exchange (C) 13 in the same manner as with the processing sequence shown in FIGS. 8 and 9 at the time the OAM loopback cells are transmitted and received normally.

The exchange (C) 13, for example, attempts to transmits an OAM loopback cell to the exchange (D) 14, but fails to normally transmit an OAM loopback cell to the exchange (D) 14 (S11). When the exchange (A) 11 receives the OAM loopback cell returned from the exchange (C) 13, if performance monitoring information is contained in the received OAM loopback cell, then the occurrence of the fault is indicated by the performance monitoring information. Therefore, the exchange (A) 11 can identify the location of the fault and analyze the cause of the fault, and indicate the location and cause of the fault to the service personnel (S12).

Thereafter, since no OAM loopback cell is sent from the exchange (D) 14 at the end point to the exchange (A) 11, reception waiting time-out occurs, and the test using the OAM loopback cell is finished with the fault being found on the communication route (S13).

The information returned with the OAM loopback cells from the exchanges is updated by the exchange (A) 11, except for the exchange (D) 14. Therefore, the information output controller 41 can output the information to the maintenance console 35, and the message output controller 39 can output a fault message to the maintenance console 35.

Figure 12:
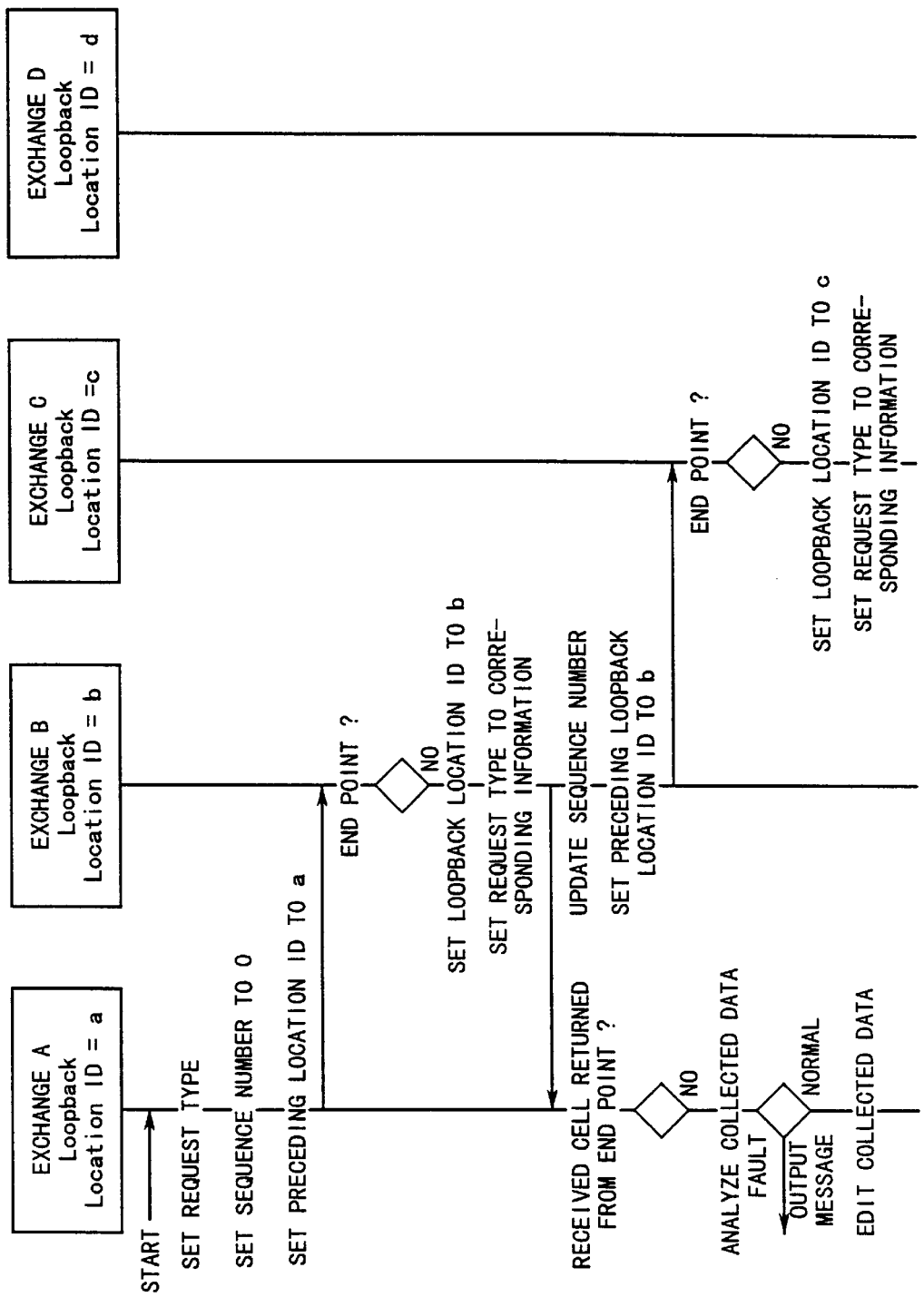
FIG. 12 is a sequence diagram showing a former portion of a processing sequence of exchanges upon transmission and reception of OAM loopback cells in the ATM network shown in FIG. 2, at the time the reception of OAM loopback cells suffers a fault.
Figure 13:
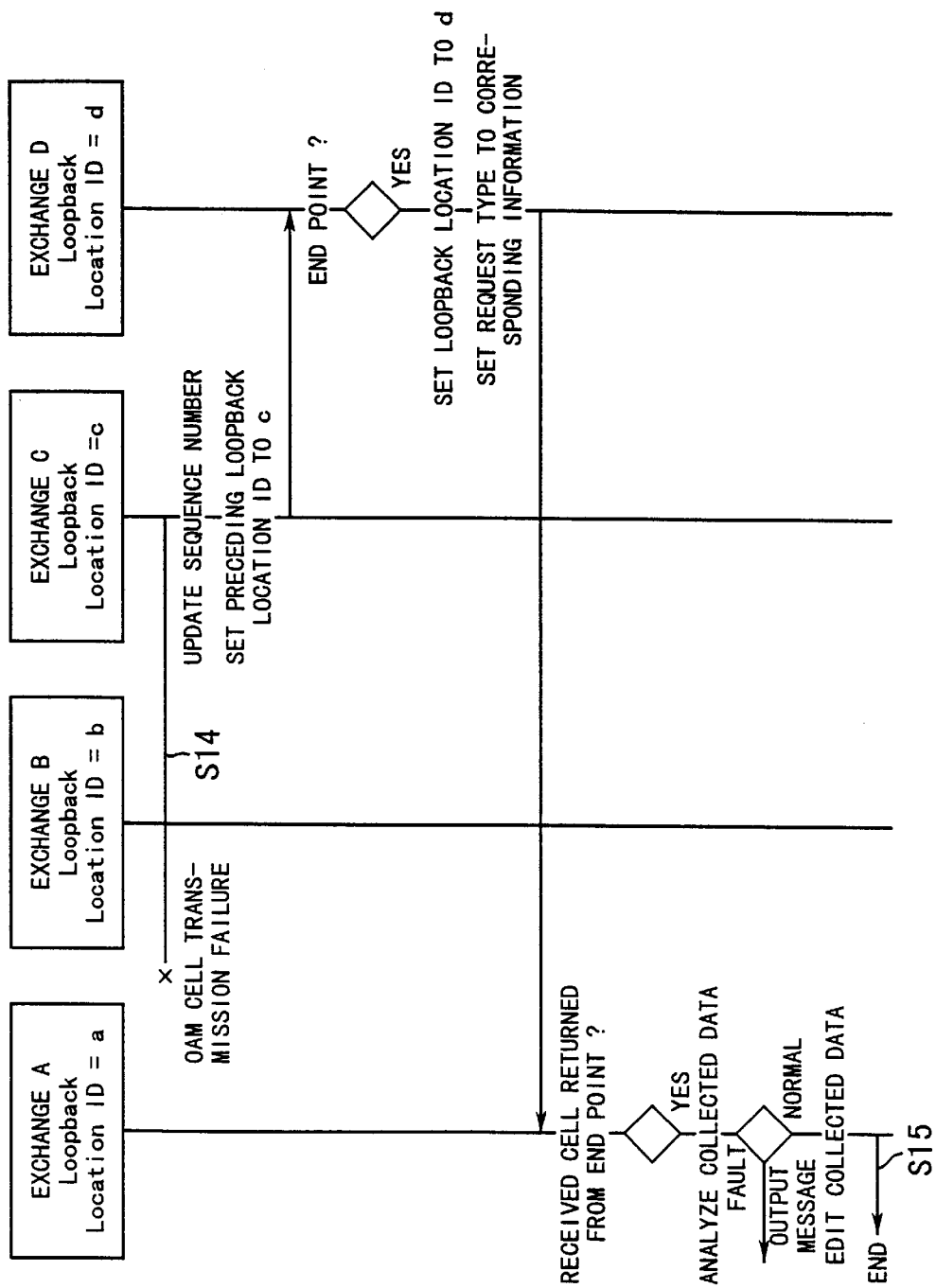
FIG. 13 is a sequence diagram showing a latter portion of the processing sequence of exchanges upon transmission and reception of OAM loopback cells in the ATM network shown in FIG. 2, at the time the reception of OAM loopback cells suffers a fault.

FIGS. 12 and 13 show a processing sequence of exchanges upon transmission and reception of OAM loopback cells in the ATM network shown in FIG. 2, at the time the reception of OAM loopback cells suffers a fault. Specifically, the processing sequence shown in FIGS. 12 and 13 is carried out when an OAM loopback cell returned from the exchange (C) 13 cannot normally be received by the exchange (A) 11. FIG. 12 shows a former portion of the processing sequence, and FIG. 13 shows a latter portion of the processing sequence. Step numbers indicated by numbers preceded by a prefix S shown in FIGS. 12 and 13 will be referred to in the description of the processing sequence which follows.

A condition in which the exchange (A) 11 cannot normally receive an OAM loopback cell returned from the exchange (C) 13 (S14) is related to a problem with the communication quality of the circuit between the exchange (A) 11 and the exchange (B) 12 and also the circuit between the exchange (B) 12 and the exchange (C) 13, a problem with the traffic capacity, and a congestion condition of the exchanges (B, C) 12, 13.

Even in the event of such a reception fault, since the OAM loopback cell from the exchange (D) 14 at the end point is normally transmitted to the exchange (A) 11, the test using the OAM loopback cell is finished with the communication route being found normal (S15). However, when performance monitoring information contained in the OAM loopback cell returned from the exchange (B) 12 to the exchange (A) 11 is analyzed, it is highly possible for a fault to be detected, producing an autonomous message indicative of the fault.

When the exchange (A) 11 receives the OAM loopback cell from the exchange (D) 14 at the end point, the exchange (A) 11 analyzes the received information and edits the collected information, and finishes the OAM cell test. The exchange (A) 11 analyzes the received information from the exchange (D) 14 and edits the collected information from the exchange (D) 14 even if there is no returned information from the exchange (C) 13.

An ATM network communication route monitoring system according to a second embodiment of the present invention will be described below.

Figure 14:
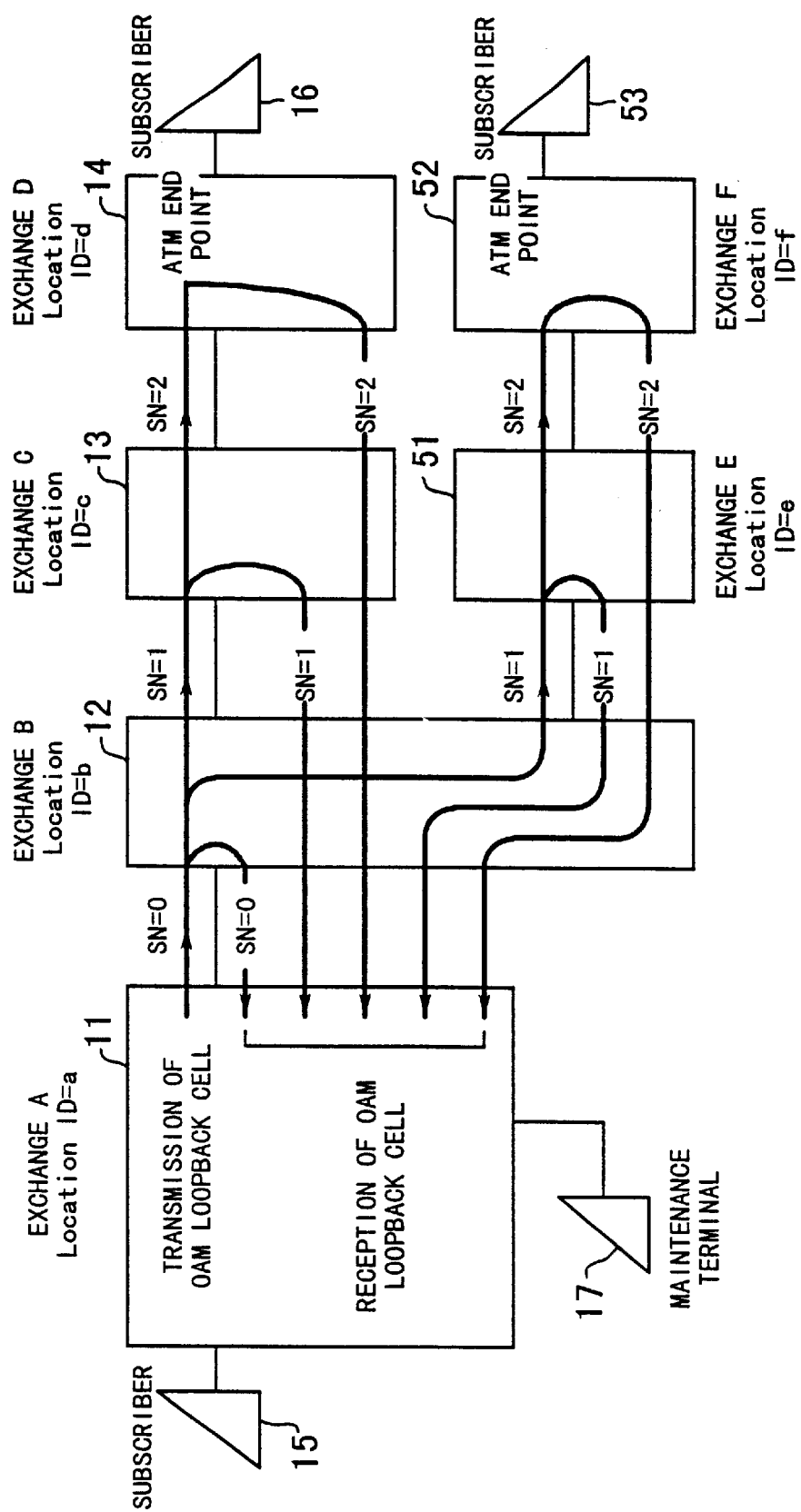
FIG. 14 is a block diagram of an ATM network of point-to-multi-point paths which incorporates an ATM network communication route monitoring system according to a second embodiment of the present invention.

FIG. 14 shows in block form an ATM network of point-to-multi-point paths which incorporates the ATM network communication route monitoring system according to the second embodiment of the present invention. The second embodiment is similar to the first embodiment, but differs therefrom in that two more exchanges are added. Those parts in the second embodiment which are identical to those in the first embodiment are denoted by identical reference characters, and will not be described below.

According to the second embodiment, an exchange (E) 51 is connected to the exchange (B) 12, and an exchange (F) 52 is connected to the exchange (E) 51. The exchanges (E, F) 51, 52 are assigned respective location IDs e, f. Many subscriber's terminals are connected to each of the exchanges (E, F) 51, 52. However, only a subscriber's terminal 53 connected to the exchange (F) 52 is illustrated in FIG. 14.

In the second embodiment, an OAM loopback cell transmitted from the exchange (A) 11 is sent from the exchange (B) 12 to the exchanges (C, D) 13, 14 and also from the exchange (B) 12 to the exchanges (E, F) 51, 52. The exchanges (E, F) 51, 52 which have received the OAM loopback cell operate in the same manner as the exchanges (C, D) 13, 14.

Figure 15:
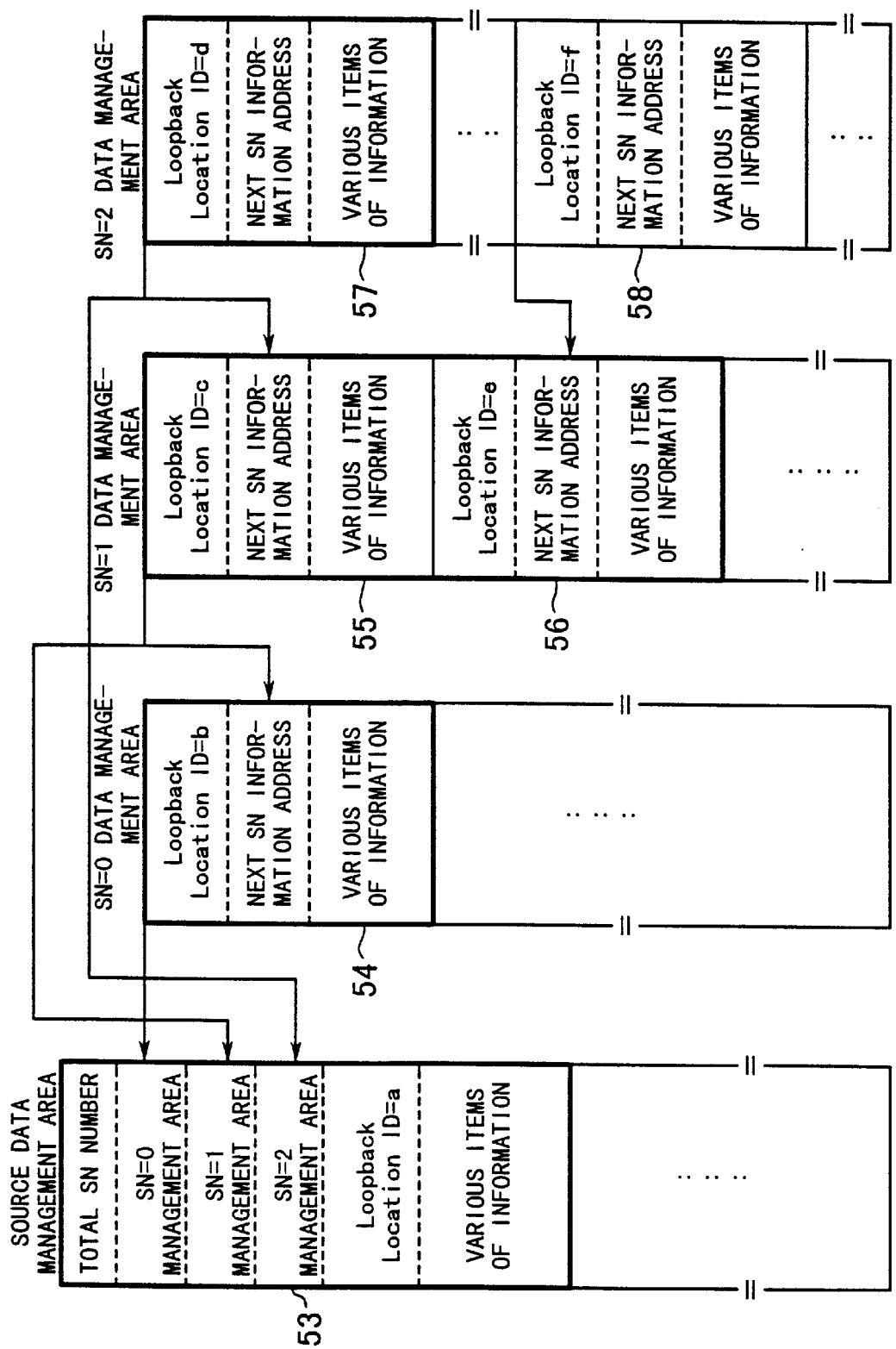
FIG. 15 is a diagram showing a process of storing data in an exchange of a source in the ATM network shown in FIG. 14.

FIG. 15 shows a process of storing data in the source exchange (A) 11. A source data management area includes a partial area 53. Similarly, an SN=0 data management area includes a partial area 54, an SN=1 data management area includes partial areas 55, 56, and an SN=2 data management area includes partial areas 57, 58. The manner in which these areas are used will be described below in a processing sequence shown in FIGS. 16~18.

Figure 16:
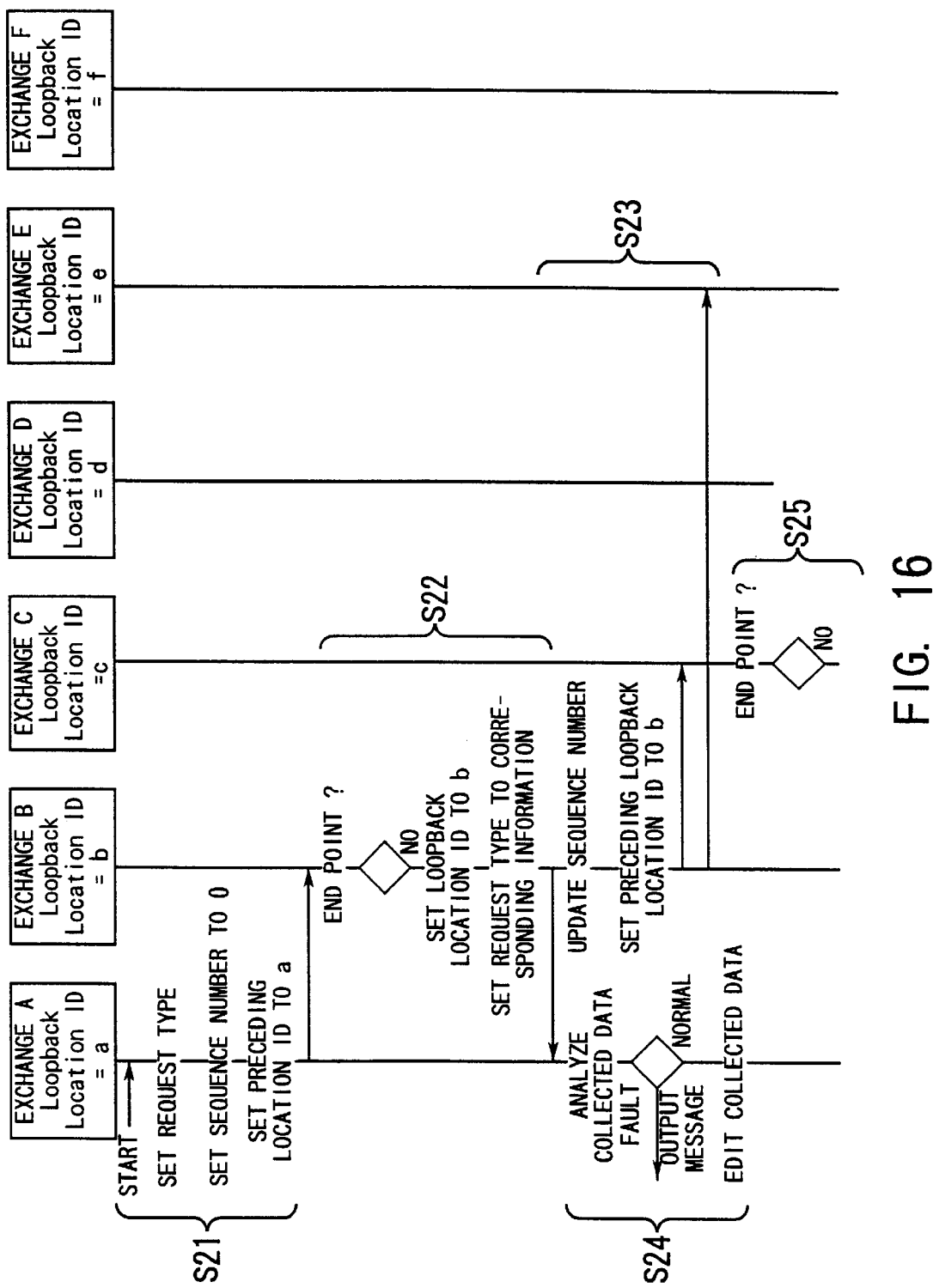
FIG. 16 is a sequence diagram showing a former portion of a processing sequence of exchanges upon transmission and reception of OAM loopback cells in the ATM network shown in FIG. 14, at the time the OAM loopback cells are transmitted and received normally.
Figure 17:
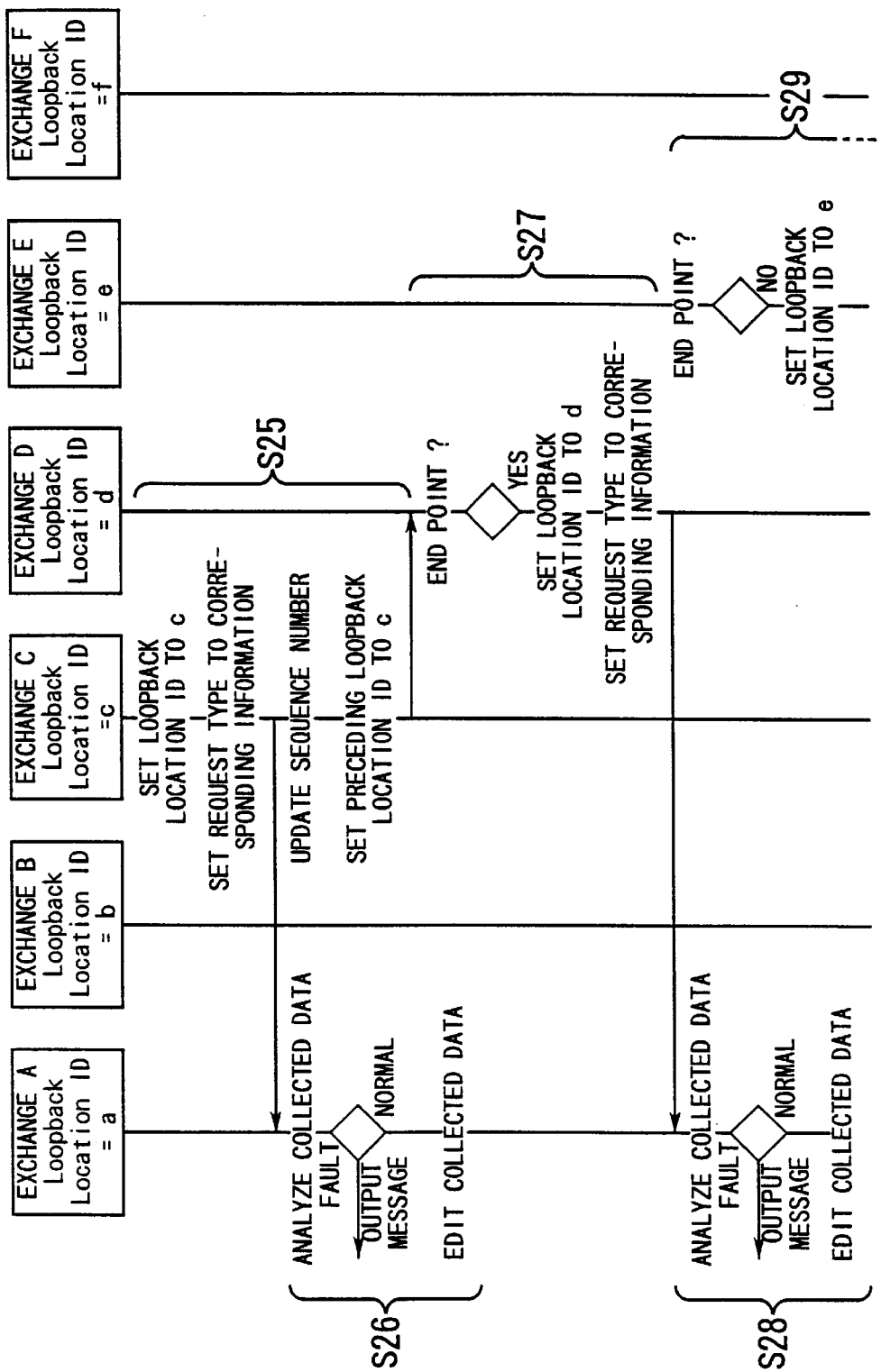
FIG. 17 is a sequence diagram showing a middle portion of the processing sequence of exchanges upon transmission and reception of OAM loopback cells in the ATM network shown in FIG. 14, at the time the OAM loopback cells are transmitted and received normally.
Figure 18:
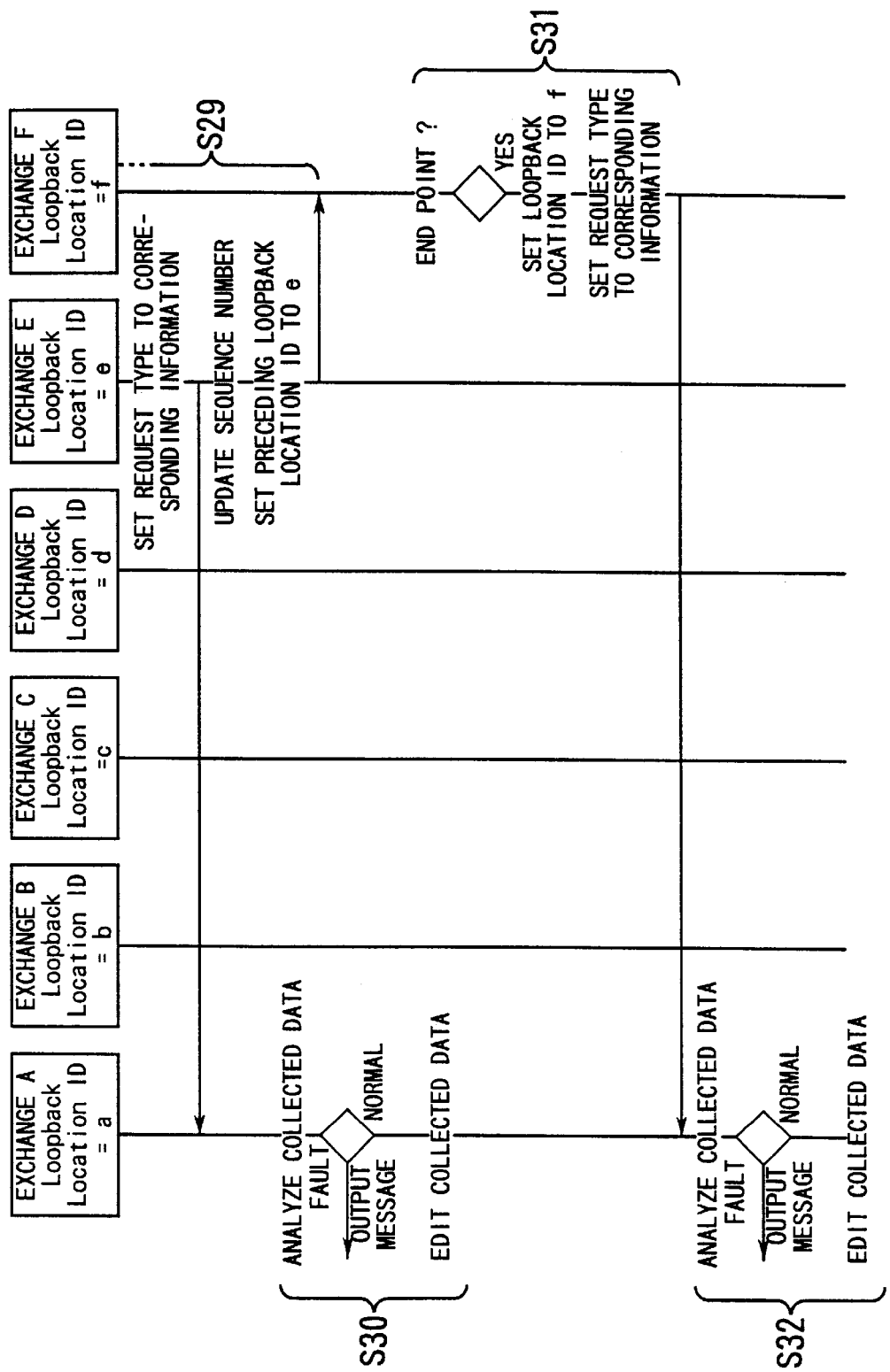
FIG. 18 is a sequence diagram showing a latter portion of the processing sequence of exchanges upon transmission and reception of OAM loopback cells in the ATM network shown in FIG. 14, at the time the OAM loopback cells are transmitted and received normally.

FIGS. 16~18 show a processing sequence of exchanges upon transmission and reception of OAM loopback cells in the ATM network shown in FIG. 14, at the time the OAM loopback cells are transmitted and received normally. FIG. 16 illustrates a former portion of the processing sequence, FIG. 17 illustrates a middle portion of the processing sequence, and FIG. 18 illustrates a latter portion of the processing sequence. Step numbers indicated by numbers preceded by a prefix S shown in FIGS. 16~18 will be referred to in the description of the processing sequence which follows.

When the exchange A receives a request to start an OAM loopback cell test with a communication path and a request type being designated from the service personnel, the exchange A transmits an end-to-end OAM loopback cell to the designated communication path. Specifically, as shown in FIG. 3, the exchange A sets the indicated request type ("inquiry about all exchanges on path route" or "information collection on path route") in the "OAM cell function type" column 22b of an OAM loopback cell, sets a value of 0 in the "sequence number" column 23e of the OAM loopback cell, sets the location ID a of the exchange (A) 11 in the preceding loopback location ID" column 23f of the OAM loopback cell, and transmits the OAM loopback cell to the exchange B (S21).

If the exchange B recognizes that the received OAM loopback cell is an end-to-end OAM loopback cell, then the exchange B ascertains whether the exchange B itself is an exchange at the end point or not. Since the exchange B is not an exchange at the end point, the exchange B returns the OAM loopback cell to the exchange A. Specifically, the exchange B sets its own location ID b in the "loopback location ID" column 23c of the OAM loopback cell, sets information corresponding to the request type set in the "OAM cell function type" column 22b of the OAM loopback cell in the OAM loopback cell, and transmits the OAM loopback cell to the exchange A (S22). Because the exchange B is not an exchange at the end point, the exchange B needs to transmit the OAM loopback cell to the exchange C. The exchange B updates the location ID a set in the "preceding loopback location ID" column 23f of the OAM loopback cell into its own location ID b, updates the value of 0 set in the "sequence number" column 23e into a value of 1, and transmits the OAM loopback cell to the exchanges C, E (S23).

The exchange A ascertains whether the OAM loopback cell received from the exchange B is returned from the end point or not. Since the OAM loopback cell received from the exchange B is not returned from the end point, the exchange A judges that it will continuously receive OAM loopback cells returned in response to the OAM loopback cell transmitted in the step S21, and keeps itself in a standby mode for receiving OAM loopback cells. The exchange A analyzes the information contained in the received OAM loopback cell according to the request type set in the "OAM cell function type" column 22b. If the exchange A detects a fault, then the exchange A outputs a message to the service personnel. After having analyzed the information, the exchange A edits and stores the collected information (S24). A process of storing the collected information will be described in detail below.

The exchange A extracts a sequence number contained in the OAM loopback cell returned from the exchange B. Because the extracted sequence number contained in the OAM loopback cell returned from the exchange B is "0", various items of information contained in the OAM loopback cell are stored in the partial area 54 (see FIG. 15) of the SN=0 data management area. Specifically, the location ID b of the exchange B which has been set in the "loopback location ID" column 23c of the OAM loopback cell is stored in a "loopback location ID" column of the partial area 54. If information is contained in the "data area" column 23g, then the information is stored in a "various information" column of the partial area 54. A value of "1" is added to the value (initially 0) in a "total SN number" column in the partial area 53 of the source data management area, and the address of a leading position in the partial area 54 is stored in an "SN=0 data management area" column of the partial area 53 of the source data management area.

Referring back to FIGS. 16~18, the exchange C processes the OAM loopback cell transmitted from the exchange B in the same manner as the exchange B, for thereby transmitting the OAM loopback cell to the next exchange D (S25). The exchange C transmits the OAM loopback cell only to the exchange D.

The exchange A receives the OAM loopback cell from the exchange C, and analyzes the OAM loopback cell according to the request type set in the "OAM cell function type" column 22b of the received OAM loopback cell. If the exchange A detects a fault, then the exchange A outputs a message to the service personnel. After the analysis, the exchange A edits and stores the collected information (S26). A process of storing the collected information will be described in detail below.

The exchange A extracts a sequence number contained in the OAM loopback cell returned from the exchange C. Because the extracted sequence number contained in the OAM loopback cell returned from the exchange C is "1", various items of information contained in the OAM loopback cell are stored in the partial area 55 (see FIG. 15) of the SN=1 data management area. Specifically, the location ID c of the exchange C which has been set in the "loopback location ID" column 23c of the OAM loopback cell is stored in a "loopback location ID" column of the partial area 55. If information is contained in the "data area" column 23g, then the information is stored in a "various information" column of the partial area 55. A value of "1" is added to the value in the "total SN number" column in the partial area 53 of the source data management area, and the address of a leading position in the partial area 55 is stored in an "SN=1 data management area" column of the partial area 53 of the source data management area. The exchange A extracts the location ID b set in the "preceding loopback location ID" column 23f of the OAM loopback cell, and searches for the partial area which stores the location ID b in the "loopback location ID" column in the SN=0 data management area shown in FIG. 15. In this case, the partial area 54 is detected. The address of the leading position in the partial area 55 of the "SN=1 data management area" column is stored in a "next SN information address" column of the detected partial area 54.

Referring back to FIGS. 16~18, the exchange D returns the OAM loopback cell to the exchange A. Specifically, the exchange D sets the location ID d of its own in the "loopback location ID" column 23c of the OAM loopback cell, sets information corresponding to the request type set in the "OAM cell function type" column 22b of the OAM loopback cell in the OAM loopback cell, and transmits the OAM loopback cell to the exchange A (S27). Since the exchange D is at the end point, the exchange D does not relay the OAM loopback cell to another exchange.

The exchange A receives the OAM loopback cell from the exchange D, and analyzes the OAM loopback cell according to the request type set in the "OAM cell function type" column 22b of the received OAM loopback cell. If the exchange A detects a fault, then the exchange A outputs a message to the service personnel. After the analysis, the exchange A edits and stores the collected information (S27). A process of storing the collected information will be described in detail below.

The exchange A extracts a sequence number contained in the OAM loopback cell returned from the exchange D. Because the extracted sequence number contained in the OAM loopback cell returned from the exchange D is "2", various items of information contained in the OAM loopback cell are stored in the partial area 57 (see FIG. 15) of the SN=2 data management area. Specifically, the location ID d of the exchange D which has been set in the "loopback location ID" column 23c of the OAM loopback cell is stored in a "loopback location ID" column of the partial area 57. If information is contained in the "data area" column 23g, then the information is stored in a "various information" column of the partial area 57. A value of "1" is added to the value in the "total SN number" column in the partial area 53 of the source data management area, and the address of a leading position in the partial area 57 is stored in an "SN=2 data management area" column of the partial area 53 of the source data management area. The exchange A extracts the location ID c set in the "preceding loopback location ID" column 23f of the OAM loopback cell, and searches for the partial area which stores the location ID c in the "loopback location ID" column in the SN=1 data management area shown in FIG. 15. In this case, the partial area 55 is detected. The address of the leading position in the partial area 57 of the "SN=2 data management area" column is stored in a "next SN information address" column of the detected partial area 55.

Referring back to FIGS. 16~18, the exchange D processes the OAM loopback cell transmitted from the exchange B in the same manner as the exchange C, for thereby transmitting the OAM loopback cell to the next exchange F (S29).

The exchange A receives the OAM loopback cell from the exchange E, and analyzes the OAM loopback cell according to the request type set in the "OAM cell function type" column 22b of the received OAM loopback cell. If the exchange A detects a fault, then the exchange A outputs a message to the service personnel. After the analysis, the exchange A edits and stores the collected information (S30). A process of storing the collected information will be described in detail below.

The exchange A extracts a sequence number contained in the OAM loopback cell returned from the exchange E. Because the extracted sequence number contained in the OAM loopback cell returned from the exchange D is "1", various items of information contained in the OAM loopback cell are stored in the partial area 56 (see FIG. 15) of the SN=1 data management area. Specifically, the location ID e of the exchange E which has been set in the "loopback location ID" column 23c of the OAM loopback cell is stored in a "loopback location ID" column of the partial area 56. If information is contained in the "data area" column 23g, then the information is stored in a "various information" column of the partial area 56. Since the information contained in the OAM loopback cell returned from the exchange C has already been stored in the "total SN number" column and the "SN=1 data management area" column of the partial area 53 of the source data management area, no information is newly stored in these columns. The exchange A extracts the location ID b set in the "preceding loopback location ID" column 23f of the OAM loopback cell, and searches for the partial area which stores the location ID b in the "loopback location ID" column in the SN=1 data management area shown in FIG. 15. In this case, the partial area 54 is detected. No information is newly stored in a "next SN information address" column of the detected partial area 54 because the address of the leading position in the partial area 55 of the "SN=1 data management area" column has already been stored in the "next SN information address" column of the detected partial area 54.

Referring back to FIGS. 16~18, the exchange F returns the OAM loopback cell to the exchange A. Specifically, the exchange F sets the location ID f of its own in the "loopback location ID" column 23c of the OAM loopback cell, sets information corresponding to the request type set in the "OAM cell function type" column 22b of the OAM loopback cell in the OAM loopback cell, and transmits the OAM loopback cell to the exchange A (S31). Since the exchange F is at the end point, the exchange F does not relay the OAM loopback cell to another exchange.

The exchange A receives the OAM loopback cell from the exchange F, and analyzes the OAM loopback cell according to the request type set in the "OAM cell function type" column 22b of the received OAM loopback cell. If the exchange A detects a fault, then the exchange A outputs a message to the service personnel. After the analysis, the exchange A edits and stores the collected information (S32). A process of storing the collected information will be described in detail below.

The exchange A extracts a sequence number contained in the OAM loopback cell returned from the exchange F. Because the extracted sequence number contained in the OAM loopback cell returned from the exchange F is "2", various items of information contained in the OAM loopback cell are stored in the partial area 58 (see FIG. 15) of the SN=2 data management area. Specifically, the location ID f of the exchange F which has been set in the "loopback location ID" column 23c of the OAM loopback cell is stored in a "loopback location ID" column of the partial area 58. If information is contained in the "data area" column 23g, then the information is stored in a "various information" column of the partial area 58. Since the information contained in the OAM loopback cell returned from the exchange D has already been stored in the "total SN number" column and the "SN=1 data management area" column of the partial area 53 of the source data management area, no information is newly stored in these columns.

The exchange A extracts the location ID e set in the "preceding loopback location ID" column 23f of the OAM loopback cell, and searches for the partial area which stores the location ID e in the "loopback location ID" column in the SN=1 data management area shown in FIG. 15. In this case, the partial area 56 is detected. The address of the leading position in the partial area 58 of the "SN=2 data management area" column is stored in a "next SN information address" column of the detected partial area 56.

In this manner, it is possible to store various items of information without confusion even if OAM loopback cells returned from different exchanges contain the same sequence number in the ATM network of point-to-multipoint paths, as shown in FIG. 15.

In the above embodiments, exchanges have been described as NEs (Network Elements) of the ATM network. However, the principles of the present invention are not limited to exchanges, but may also be applicable to other communication devices of networks, such as cross-connect communication devices, for example.

With the arrangement of the present invention, when the communication device which performs the network management function in the ATM network sends out an end-to-end OAM loopback cell having such attributes that it will be returned from the communication device at the end point of the ATM network, the communication device adds "inquiry about all exchanges on path route" information to the OAM loopback cell. When each of the communication devices on the communication route receives the OAM loopback cell with the added "inquiry about all exchanges on path route" information, it adds its own identification information to the OAM loopback cell and returns the OAM loopback cell to the source communication device.

The ATM network communication route monitoring system makes it possible for a communication device which performs a network management function in an ATM network that has no OpS (Operation System) to recognize how cells reach the communication devices of the ATM network and through which exchanges the cells are transmitted. Even in the event of a circuit disconnection in a path being inspected for its route, it is possible to confirm the communication route up to the fault. Furthermore, each of the communication devices can function as a communication device which performs a network management function when service personnel issues a command through a maintenance terminal connected to the communication device. Consequently, the ATM network communication route monitoring system allows easy maintenance for ATM networks.

The communication device which performs the network management function delivers an OAM loopback cell with "information collection on path route" information added thereto. When each of the communication devices on the communication route receives the OAM loopback cell with the added "information collection on path route" information, the communication device adds traffic information, performance monitoring information, or congestion information depending on the request type contained in the added information, and returns the OAM loopback cell with the added traffic information, performance monitoring information, or congestion information to the source communication device. Consequently, a communication device which performs a network management function in an ATM network that has no OpS (Operation System) can easily obtain traffic information, performance monitoring information, and congestion information. Based on the obtained information, the status of the communication route, not the instant the OAM loopback cell is received, but over a certain period of time, can be recognized, thereby facilitating the analysis of a cause of a problem that may occur on the communication route.

The OAM loopback cell includes a "sequence number" column, and each of the communication devices which relays the OAM loopback cell updates the sequence number each time it relays the OAM loopback cell. Therefore, when the communication device which performs the network management function receives OAM loopback cells from the communication devices, it can recognize the sequence of the communication devices on the communication route and the number of the communication devices on the communication route, based on the sequence numbers contained in the received OAM loopback cells. Even if the communication device which performs the network management function does not receive an OAM loopback cell properly, the communication device can easily manage various pieces of information. Furthermore, the OAM loopback cell includes a "preceding loopback location ID" column in addition to the "sequence number" column. The preceding loopback location ID set in the "preceding loopback location ID" column allows the communication device which performs the network management function to store various pieces of information without confusion even if OAM loopback cells returned from different exchanges contain the same sequence number in the ATM network of point-to-multipoint paths.

When the communication device which performs the network management function compares various pieces of information collected by OAM loopback cells with redetermined threshold values, the communication device can easily detect a fault that may take place on the communication route. Based on the detected fault, the communication device can issue an alarm indicative of the fault through the maintenance terminal to the service personnel.

The communication device which performs the network management function stores various items of information collected by returned OAM loopback cells with respect to each of communication paths. When the service personnel inquires various items of information with respect to a certain designated communication path, the various items of information with respect to the designated communication path are delivered to the service personnel. The service personnel can thus accurately recognize conditions of the communication path when necessary, and make a maintenance action with ease.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication route monitoring system for monitoring, with OAM loopback cells, a communication route in an ATM network including virtual paths or virtual channels and a plurality of communication devices for terminating or relaying the virtual paths or virtual channels, comprising:

first OAM loopback cell delivering means disposed in one of the communication devices which performs a network management function, for delivering a first OAM loopback cell for confirming a communication route to a route terminal point;

first returning and relaying means disposed in each of the communication devices, for returning the first OAM loopback cell upon reception of the first OAM loopback cell, together with its own location identification added thereto, to a source, and relaying the received first OAM loopback cell to a next one of the communication devices; and communication route recognizing means disposed in said communication device which performs the network management function, for analyzing the first OAM loopback cell returned from said first returning and relaying means to recognize a status of the communication route.

2. A communication route monitoring system according to claim 1, wherein said first OAM loopback cell delivering means comprises means for adding a sequence number to said first OAM loopback cell and delivering the first OAM loopback cell with the added sequence number, and wherein said first returning and relaying means comprises means for updating and outputting said sequence number when relaying the received first OAM loopback cell.

3. A communication route monitoring system according to claim 2, wherein said first returning and relaying means comprises means for adding a location identification of a preceding one of the communication devices to the first OAM loopback cell upon reception of said first OAM loopback cell, and returning the first OAM loopback cell with the added location identification to the source, and wherein said communication route recognizing means comprises means for referring to the location identification of said preceding one of the communication devices contained in said first OAM loopback cell returned from said first returning and relaying means and said sequence number to recognize the status of the communication route.

4. A communication route monitoring system according to claim 1, wherein said communication route recognizing means comprises means for finishing a processing sequence thereof upon reception of said first OAM loopback cell returned from one of said communication devices at said route terminal point.

5. A communication route monitoring system according to claim 1, further comprising:

second OAM loopback cell delivering means disposed in said one of the communication devices which performs the network management function, for delivering a second OAM loopback cell for collecting communication route information to the route terminal point;

second returning and relaying means disposed in each of the communication devices, for returning the second OAM loopback cell upon reception of the second OAM loopback cell, together with its own communication route information added thereto, to a source, and relaying the received second OAM loopback cell to a next one of the communication devices; and communication route information storing means disposed in said communication device which performs the network management function, for extracting the communication route information contained in the second OAM loopback cell returned from said second returning and relaying means and updating and storing the communication route information.

6. A communication route monitoring system according to claim 5, wherein said communication route information comprises traffic information.

7. A communication route monitoring system according to claim 5, wherein said communication route information comprises performance monitoring information.

8. A communication route monitoring system according to claim 5, wherein said communication route information comprises congestion information.

9. A communication route monitoring system according to claim 5, wherein said second OAM loopback cell delivering means comprises means for adding a sequence number to said second OAM loopback cell and delivering the second OAM loopback cell with the added sequence number, and wherein said second returning and relaying means comprises means for updating and outputting said sequence number when relaying the received second OAM loopback cell.

10. A communication route monitoring system according to claim 9, wherein said second returning and relaying means comprises means for adding a location identification of a preceding one of the communication devices to the second OAM loopback cell upon reception of said second OAM loopback cell, and returning the second OAM loopback cell with the added location identification to the source, and wherein said communication route information storing means comprises means for referring to the location identification of said preceding one of the communication devices contained in said second OAM loopback cell returned from said second returning and relaying means and said sequence number to update and store the communication route information.

11. A communication route monitoring system according to claim 5, wherein said communication route information storing means comprises means for finishing a processing sequence thereof upon reception of said second OAM loopback cell returned from one of said communication devices at said route terminal point.

12. A communication route monitoring system according to claim 5, further comprising:

fault detecting means disposed in said one of the communication devices which performs the network management function, for detecting a fault based on the communication route information contained in the second OAM loopback cell returned from said second returning and relaying means; and indicating means for indicating a fault to service personnel when the fault is detected by said fault detecting means.

13. A communication route monitoring system according to claim 5, wherein said communication route information storing means comprises means for storing the extracted communication route information with respect to each of communication routes, further comprising:

display means responsive to a request for displaying communication route information with respect to one of the communication routes which is designated by service personnel, for referring to said communication route information storing means, and reading and displaying the communication route information corresponding to the designated communication route.

* * * * *